(12) United States Patent
Shirota et al.

(10) Patent No.: US 9,626,940 B2
(45) Date of Patent: Apr. 18, 2017

(54) DATA PROCESSING DEVICE, DISPLAY CONTROL DEVICE, SEMICONDUCTOR CHIP, METHOD OF CONTROLLING DISPLAY DEVICE, AND COMPUTER-READABLE MEDIUM

(71) Applicant: KABUSHIKI KAISHA TOSHIBA, Minato-ku, Tokyo (JP)

(72) Inventors: Yusuke Shirota, Yokohama (JP); Tatsunori Kanai, Yokohama (JP); Tetsuro Kimura, Tama (JP); Koichi Fujisaki, Kawasaki (JP); Akihiro Shibata, Inagi (JP); Haruhiko Toyama, Kawasaki (JP); Junichi Segawa, Kawasaki (JP); Masaya Tarui, Yokohama (JP); Satoshi Shirai, Kawasaki (JP); Hiroyoshi Haruki, Kawasaki (JP); Shiyo Yoshimura, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 137 days.

(21) Appl. No.: 14/190,411

(22) Filed: Feb. 26, 2014

(65) Prior Publication Data

US 2014/0240333 A1     Aug. 28, 2014

(30) Foreign Application Priority Data

Feb. 28, 2013   (JP) .................................. 2013-040169

(51) Int. Cl.
*G09G 5/39* (2006.01)
*G09G 5/02* (2006.01)
*G09G 5/395* (2006.01)

(52) U.S. Cl.
CPC ................ *G09G 5/39* (2013.01); *G09G 5/02* (2013.01); *G09G 5/395* (2013.01);
(Continued)

(58) Field of Classification Search
None
See application file for complete search history.

(56) References Cited

U.S. PATENT DOCUMENTS 8,233,164 B2   7/2012  Matsuda
8,780,127 B2   7/2014  Takeishi
(Continued)

FOREIGN PATENT DOCUMENTS

CN   101119548     2/2008
JP   2002-230970   8/2002
(Continued)

OTHER PUBLICATIONS

Freescale Semiconductor, Inc., i.MX50 Applications Processor Reference Manual, Rev. 1, Chapter 24, Electrophoretic Display Controller (EPDC), Oct. 2011.
(Continued)

*Primary Examiner* — Xiao Wu
*Assistant Examiner* — Mohammad H Akhavannik
(74) *Attorney, Agent, or Firm* — Amin, Turocy & Watson LLP; Gregory Turocy

(57) ABSTRACT

A data processing device according to embodiments comprises a data converting unit, a selecting unit, a managing unit, a updating unit, and a controller. The data converting unit is configured to convert update-data for updating at least a part of an electronic paper into processed update-data to be displayed. The selecting unit is configured to select an update-control-information identifier to be used for updating the electronic paper with the processed update-data. The managing unit is configured to store the processed update-
(Continued)

data and a selected update-control-information identifier on a first memory. The updating unit is configured to instruct a drawing step of the electronic paper using the processed update-data and the update-control-information identifier stored on the first memory. The controller is configured to, when the processed update-data and the update-control-information identifier are stored on the first memory, execute the drawing step of the electronic paper using the processed update-data and the update-control-information identifier stored in the first memory in response to the instruction from the updating unit.

13 Claims, 27 Drawing Sheets

(52) U.S. Cl.
CPC . *G09G 2330/021* (2013.01); *G09G 2360/121* (2013.01); *G09G 2380/14* (2013.01)

(56) References Cited

U.S. PATENT DOCUMENTS

| | | | |
|---|---|---|---|
| 8,922,565 | B2 | 12/2014 | Street |
| 2004/0189666 | A1* | 9/2004 | Frisken ............... G06T 11/001 345/611 |
| 2006/0123192 | A1 | 6/2006 | Uno |
| 2009/0141033 | A1 | 6/2009 | Street |
| 2009/0147288 | A1 | 6/2009 | Matsuda |
| 2012/0188272 | A1* | 7/2012 | Wang ................... G09G 3/344 345/629 |
| 2012/0246356 | A1 | 9/2012 | Shibata et al. |
| 2012/0246390 | A1 | 9/2012 | Kanai et al. |
| 2012/0246501 | A1 | 9/2012 | Haruki et al. |
| 2012/0246503 | A1 | 9/2012 | Fujisaki et al. |
| 2012/0287451 | A1 | 11/2012 | Takeishi |
| 2013/0073812 | A1 | 3/2013 | Kanai et al. |
| 2013/0080812 | A1 | 3/2013 | Shirota et al. |
| 2013/0080813 | A1 | 3/2013 | Tarui et al. |
| 2013/0091372 | A1 | 4/2013 | Kimura et al. |
| 2013/0191670 | A1 | 7/2013 | Haruki et al. |
| 2013/0219203 | A1 | 8/2013 | Fujisaki et al. |
| 2013/0254773 | A1 | 9/2013 | Kimura et al. |
| 2013/0268781 | A1 | 10/2013 | Kanai et al. |
| 2014/0013138 | A1 | 1/2014 | Kanai et al. |
| 2014/0013140 | A1 | 1/2014 | Segawa et al. |
| 2014/0075227 | A1 | 3/2014 | Shirota et al. |
| 2014/0077604 | A1 | 3/2014 | Shibata et al. |
| 2014/0089715 | A1 | 3/2014 | Kimura et al. |
| 2014/0139500 | A1 | 5/2014 | Kimura et al. |
| 2014/0245039 | A1 | 8/2014 | Segawa et al. |
| 2014/0245045 | A1 | 8/2014 | Haruki et al. |
| 2014/0245047 | A1 | 8/2014 | Yoshimura et al. |

FOREIGN PATENT DOCUMENTS

| | | |
|---|---|---|
| JP | 2006-163801 | 6/2006 |
| JP | 2009-140295 | 6/2009 |
| JP | 2009-282880 | 12/2009 |
| JP | 2011-193387 | 9/2011 |
| JP | 2012-234454 | 11/2012 |
| TW | 200935350 | 8/2009 |

OTHER PUBLICATIONS

Taiwanese Office Action for Taiwanese Patent Application No. 102147288 mailed Jul. 31, 2015.
Japanese Office Action for Japanese Patent Application No. 2013-040169 mailed on Sep. 13, 2016. English Translation obtained from USPTO Global Dossier on Oct. 18, 2016. Dictionary last updated Oct. 17, 2016.

* cited by examiner

FIG.4

PREPROCESS CACHE DATA PART

| TAG PART | | | PREPROCESSED UPDATE-DATA | |
|---|---|---|---|---|
| <UPDATE-DATA ID, UPDATE-METHOD TAG> | VALID BIT | UPDATE-CONTROL-INFORMATION SELECTION ID | <DATA SIZE> | CONTENT DATA |
| <1, B> | VALID | 0 | <20,100> | PREPROCESSED UPDATE-DATA A |
| <1, W> | VALID | 1 | <20,100> | PREPROCESSED UPDATE-DATA A' |
| <2, B> | VALID | 0 | <20,100> | PREPROCESSED UPDATE-DATA B |
| <2, W> | VALID | 1 | <20,100> | PREPROCESSED UPDATE-DATA B' |
| <3, G> | VALID | 34 | <200,200> | PREPROCESSED UPDATE-DATA C |
| <4, G> | VALID | 52 | <200,200> | PREPROCESSED UPDATE-DATA C' |

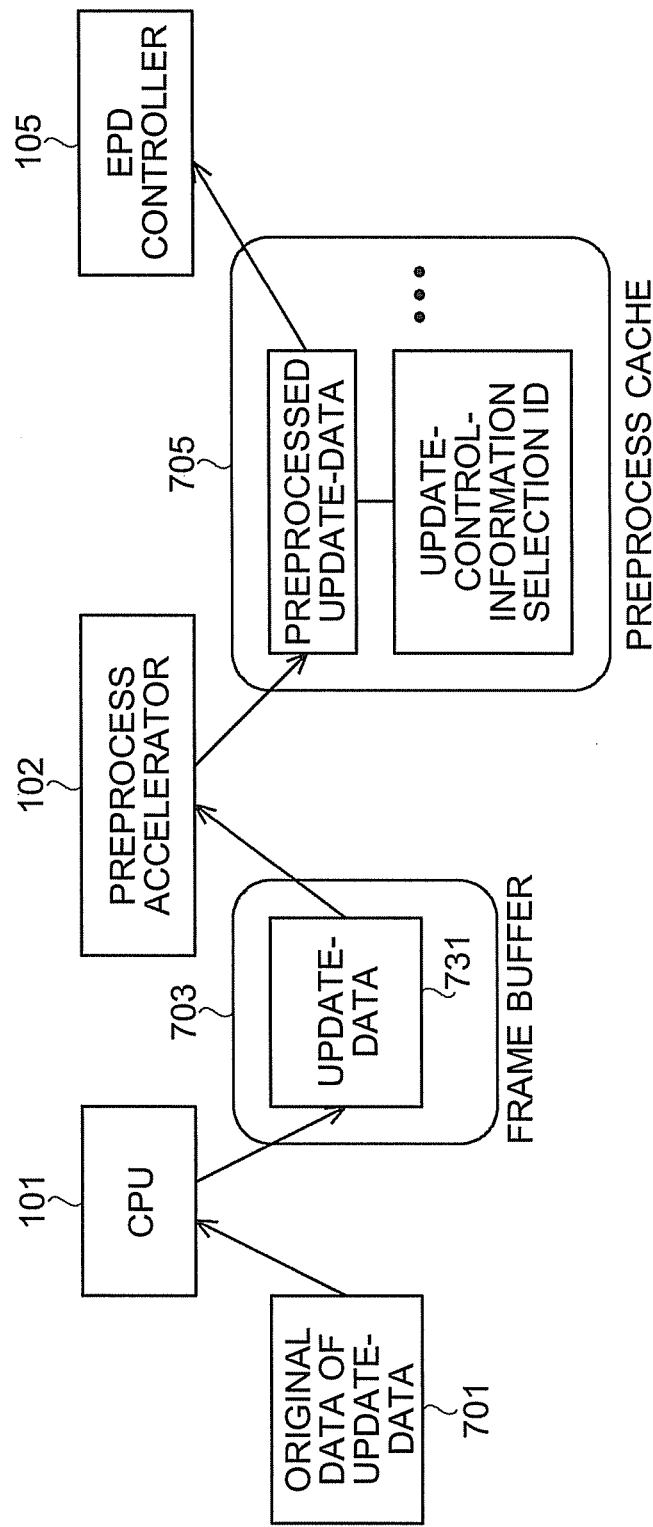

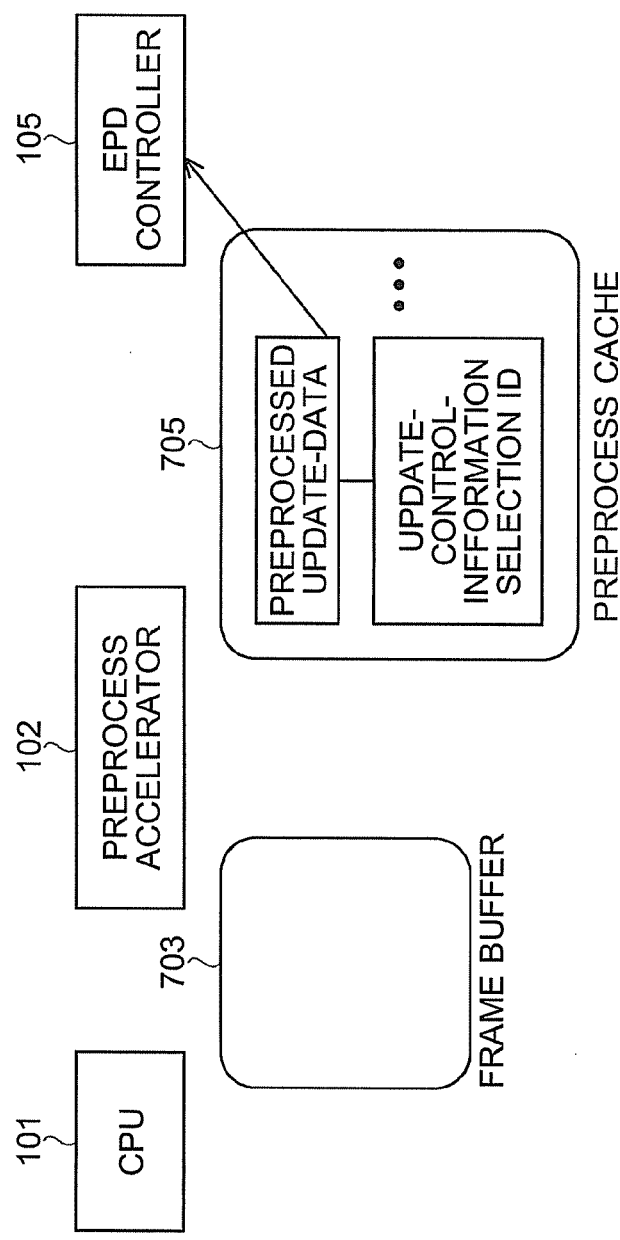

FIG.30

| PREPROCESSED UPDATE-DATA ID | VALID BIT | PREPROCESSED UPDATE-DATA |
|---|---|---|
| 1 | VALID | PRE-PROCESSED UPDATE-DATA A |
| 2 | VALID | PRE-PROCESSED UPDATE-DATA B |
| 22 | VALID | PRE-PROCESSED UPDATE-DATA C |
| 45 | VALID | PRE-PROCESSED UPDATE-DATA D |

FIG.33

| TAG PART | | | | PREPROCESS CACHE DATA TAG | |
|---|---|---|---|---|---|
| <UPDATE-DATA ID, UPDATE-METHOD TAG> | TEMPERATURE RANGE | VALID BIT | UPDATE-CONTROL- INFORMATION SELECTION ID | PREPROCESSED UPDATE-DATA | |
| | | | | <DATA SIZE> | CONTENT DATA |
| <1, B> | ~5°C | VALID | 13 | <20,100> | PREPROCESSED UPDATE-DATA A |
| | 5°C~10°C | VALID | 12 | | |
| | 10°C~15°C | VALID | 11 | | |
| | 15°C~20°C | VALID | 0 | | |
| | 20°C~25°C | VALID | 1 | | |
| | 25°C~ | VALID | 2 | | |

DATA PROCESSING DEVICE, DISPLAY CONTROL DEVICE, SEMICONDUCTOR CHIP, METHOD OF CONTROLLING DISPLAY DEVICE, AND COMPUTER-READABLE MEDIUM

CROSS-REFERENCE TO RELATED APPLICATION(S)

This application is based upon and claims the benefit of priority from the Japanese Patent Application No. 2013-040169, filed on Feb. 28, 2013; the entire contents of which are incorporated herein by reference.

FIELD

An embodiment described herein relates generally to a data processing device, a display control device, a semiconductor chip, a method of controlling display device, and a computer-readable medium.

BACKGROUND

For a data processing device such as a portable small data processing device including a slate terminal, a tablet terminal, or the like, an electronic POP (point of purchase advertising) and an electronic chart, improvement of power efficiency is an important technical issue. By using a low-power-consumption display such as an electronic paper as a display of such data processing device, power consumption for display-updating of the electronic paper being very small, it is possible to suppress power consumption during idle time such as a time period during which user browses a display.

Generally, in an update-process of an electronic paper, a two-stage process which includes a preprocess for data to be displayed (hereinafter referred to as update-data) and a drawing process for updating a display of an electronic paper using the preprocessed data is necessary. The preprocess for an electronic paper includes two steps which are a processing step and a selecting step. In the processing step, by processing update-data such as image data, preprocessed update-data is created. In the selecting step, information (hereinafter referred to as update-control information) including drive voltages used for updating a display of an electronic paper with the preprocessed update-data is selected, and information (hereinafter referred to as update-control-information selection information) for identifying the selected update-control information is created. Due to throughput of the steps being high, these steps required large power consumption and long process time.

BRIEF DESCRIPTION OF THE DRAWINGS

FIG. 4 is an illustration showing a configuration example of a preprocess cash according to the first embodiment;

FIG. 18 is an illustration showing a case where update-process is executed with hint information being added according to a seventh embodiment;

FIG. 19 is an illustration showing update-process according to the seventh embodiment;

FIG. 20 is a illustration showing a cash entry of a preprocess cash according to the seventh embodiment;

FIG. 30 is an illustration showing a configuration example of a preprocess cash according to the twelfth embodiment;

FIG. 33 is an illustration showing an configuration example of a preprocess cash according to a fourteenth embodiment.

DETAILED DESCRIPTION

Figure 1:
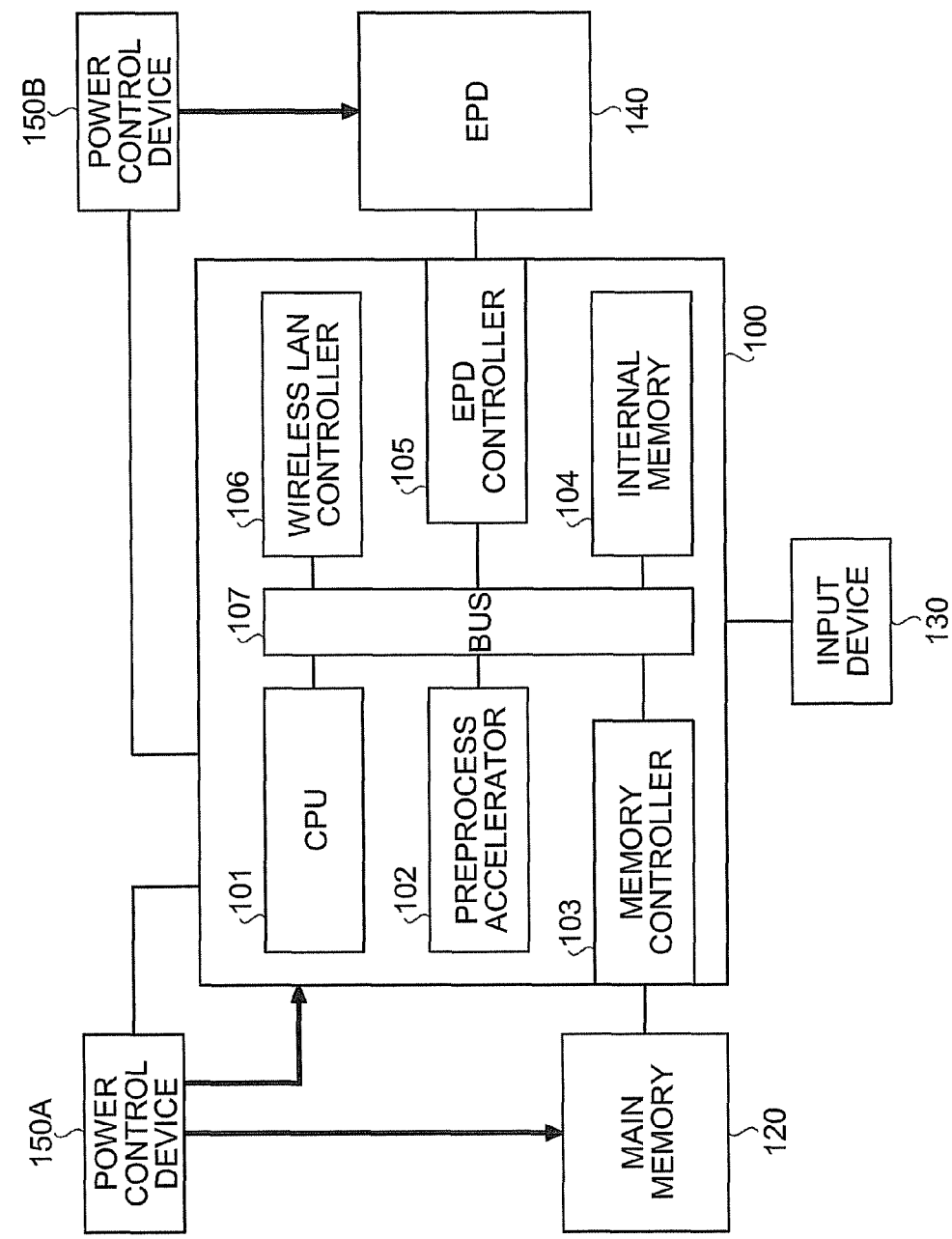
FIG. 1 is a block diagram showing an outline configuration of a data processing device according to a first embodiment.

Exemplary embodiments of a data processing device, a display control device, a semiconductor chip, a method of controlling display device, and a computer-readable medium will be explained below in detail with reference to the accompanying drawings.

For example, in a processing of update-data (the processing is a data converting process, for instance, and may be executed by a data converter 113a), in order to display color image data on a gray-scale electronic paper, a process of converting image data into a gray-scaled image data, a black-and-white (binary) image data, or the like, a process of inverting a black-and-white image data, a process of scaling image data for fitting a size of the image data to a display size of an electronic paper or a size of an update region in a case where an electronic paper is partially updated, and so forth, are executed.

In a selection step of update-control information (the selection step may be executed by a selector 113b of a preprocessor 113), in order to select proper update-control information enabling execution of a target update-process without unnecessary consumption of power and time, data analysis of update-data, or the like, should be executed. Because load on a data processing device may increase, when the proper update-control information was not selected, the selection step is a very important process.

The update-control information is information including descriptions on how to impress voltage for converting pixel values of pixels or sets of pixels of an electronic paper into desired gray-scale pixel values, how to impress voltage for converting a color of each pixel into a desired color in a case where an electronic paper is a color electronic paper, and so on. The update-control information can be referred to as Waveform. The update-control information may include information on how to apply voltage values, periods of impressing voltage and combinations of the voltage value and the period while changing the voltage value and the period in a certain order, or the like.

A plurality of the update-control information are arranged on the data processing device, and they need to be properly used based on an update-method of an electronic paper. For example, a proper update-control information is selected and used from among the plurality of the update-control information depending on the number of gradations of the original image data, a character of an image obtained by histogram analysis of the original image data, difference of update-methods (for instance, a difference between an update-method with which update-speed is slow but residual image of pre-update character, or the like, is small and an update-method with which update-speed is fast but residual image can easily occur, or between an update-method with which update-speed is slow but intended color is less-visible in a process of updating and an update-method of which update-speed is fast but intended color is visible), or a variation of surrounding temperature. Therefore, different update-control information may be used for the same update-data depending on a situation.

A drawing process of an electronic paper becomes available by executing such preprocess and creates a pair of preprocessed update-data and update-control-information selection information. The preprocess, as described above, takes comparatively large power consumption and long process time. Moreover, in a color electronic paper, or the like, there is a case where a sequence of voltage impression with varying voltages variation becomes complex, an update-sequence becomes complex depending on an arrangement of colors in update-data, or the like. In such case, regarding the selection step in the preprocess, processes for image analysis and character extraction become complex, and as a result, a case where power consumption and process time are increased may occur.

In the following embodiments, a data processing device, a display control device, a semiconductor chip, a method of controlling display device, and a computer-readable medium which are able to reduce the power consumption and process time necessary for a preprocess for an electronic paper will be exampled.

First Embodiment

Firstly, a data processing device, a display control device, a semiconductor chip, a method of controlling display device, and a computer-readable medium according to a first embodiment will be described in detail with the accompanying drawings.

FIG. 1 is a block diagram showing an outline configuration of a data processing device according to a first embodiment. As shown in FIG. 1, a data processing device 1 has a SoC (system on a chip) 100, a main memory 120, a memory display 140, power control devices 150A and 150B, and an input device 130.

The memory display 140 is an electronic paper (EPD: electronic paper display), for instance. Hereinafter, the symbol 140 represents to the EPD. As a method of the electronic paper in the EPD 140, various kinds of methods such as an electrophoretic display, a quick response liquid powder display, a cholesteric liquid crystal display, or the like, can be applied.

The input device 130 includes a touch panel acting as a pointing device arranged on an outer surface of the EPD 140. The data processing device may include another input device such as a keyboard, a mouse, or the like.

The main memory 120 may be a non-volatile memory such as a MRAM (magnetoresistive random access memory), or the like. On the main memory 120, update-data to be displayed on the EPD 140 and one or more update-control information being candidates for selection in a selection step in a preprocess are stored. In the first embodiment, a preprocess cache constructed from a pair of a preprocessed update-control information obtained at a processing step in the preprocess and an update-control-information selection ID (the update-control-information selection ID is an update-control-information selection identifier, for instance, and this is the same in the following embodiments as well) created at a selection step in the same preprocess is stored on the main memory 120.

The power control device 150A powers the main memory 120 and the SoC 100, and the power control device 150B powers the EPD 140. Each of the power control devices 150A and 150B may be a PMIC (power management integrated circuit), or the like, respectively.

The data processing device 1 has an accumulator such as a solar cell, a capacitor, or the like, and may operate on electricity generated by the solar cell. In such case, the accumulator may store a surplus power generated by the solar cell at idle time. The power control device 150A and 150B execute power-controls for powering the unit of the data processing device 1 so that a peak power consumption at an active time, or the like, is covered by both the electricity stored on the accumulator and the electricity generated by the solar cell. As described above, one purpose of the embodiments is to make the data processing device operate with very small electricity. As an outline for achieving such purpose, each module of the data processing device is transited to a standby mode or a power-saving mode with low power consumption aggressively, whereby power consumption can be reduced. Therefore, it is not the only power-saving of the preprocess that is important. When process time of a preprocess is long, even if the data processing device is made to transit to a standby mode with low power consumption aggressively during idle time of the data processing device (e.g. waiting time of response from user and time without usage of the data processing device) in order to reduce the power consumption, it is difficult to obtain the expected effects with the transit to the standby mode for the active time becomes long. Furthermore, because responsiveness of the data processing device is influenced by the process time of the preprocess, when the process time is long, usability of the data processing device may be seriously impaired. Therefore, reduction of process time of the preprocess is also very important. This is the same in the other embodiments.

The SoC 100 includes a CPU (central processing unit) 101, a memory controller 103, an EPD controller 105, a preprocess accelerator 102 used for a preprocess, an internal memory 104 and a communication interface such as a wireless LAN controller 106. These units are connected with each other via a bus 107.

For effective utilization of standby modes, the SoC 100 may provide a plurality of standby modes of which power consumptions at the standby modes and electricity costs for transiting/resuming to/from the standby modes are different.

The EPD controller 105 uses the main memory 120 as a working memory. The EPD controller 105 reads out preprocessed update-data and update-control information corresponding to update-control-information selection ID from the main memory 120, and executes a drawing process for the EPD 140. The EPD controller 105 can update a plurality of partial regions on the EPD 140 in parallel.

Figure 2:
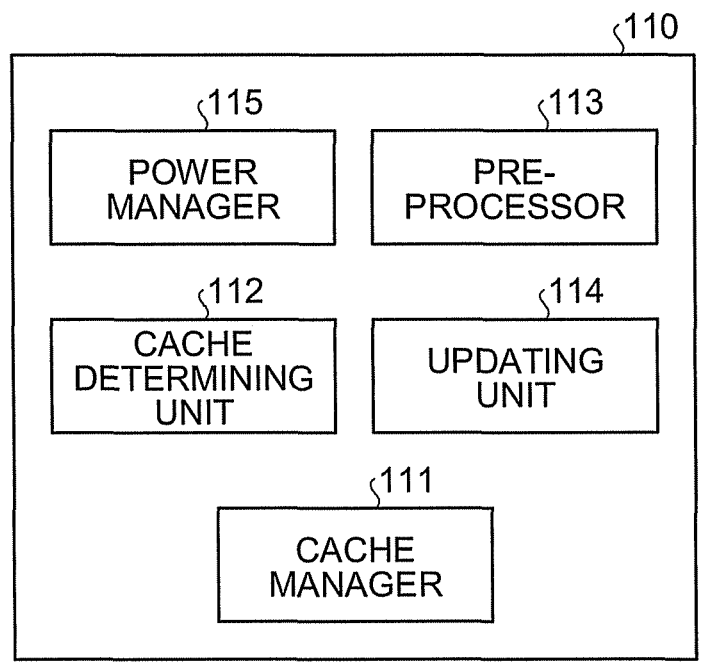
FIG. 2 is a block diagram showing an outline configuration of an EPD update-control unit according to the first embodiment.
Figure 3:
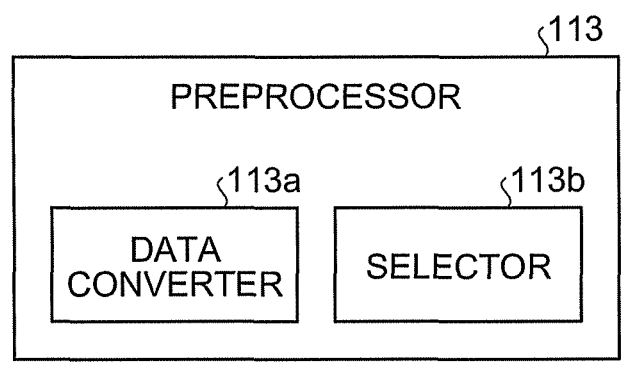
FIG. 3 is a block diagram showing an outline configuration of a preprocessing unit according to the first embodiment.

FIG. 2 is a block diagram showing an outline configuration of an EPD update controller according to the first embodiment. As shown in FIG. 2, the EPD update controller 110 may be an operating system (hereinafter referred to as OS) operating on the CPU 101, a device driver of the EPD controller 105, or the like. The EPD update controller 110 includes a power manager 115, a preprocessor 113, a cache determining unit 112, an updating unit 114 and a cache manager 111 (also referred to as manager). As shown in FIG. 4, the preprocessor 113 includes a data converter 113a and a selector 113b.

When the EPD update controller 110 receives an instruction for updating a part or all of a region of the EPD 140 from application software, middleware, or the like, operating on the data processing device 1, by making the power manager 115, the preprocessor 113, the cache determining unit 112, the updating unit 114 and the cache manager 111 collaboratively operate, the EPD update controller 110 checks whether a result of a preprocess of an update-process using the same update-data and the same update-control information hits a preprocess cache in the main memory 120 or not (cache-hit). When the result hits the preprocess cache, the EPD update controller 110 executes a drawing process of the EPD 140 while reusing data on the preprocess cache. Thereby, it is possible to reduce the power consumption and process time for the preprocess. Furthermore, by reduction of the process time for the preprocess (hereinafter referred to as preprocess time), it is possible to prolong a period for powering off the main memory 120 constructed from a MRAM, whereby it is possible to further reduce the power consumption.

Moreover, generally, transition of the SoC 100 to a standby mode with lower power consumption requires larger power consumption and longer process time for resuming from the standby mode. Therefore, in order to reduce the total power consumption, idle time that compensates for the necessary power consumption for resuming from the standby mode is needed. In the first embodiment, as described above, because the preprocess time can be reduced, it is possible to prolong the idle time and increase chances to use the standby mode with low power consumption, and as a result, it is possible to further reduce the power consumption.

FIG. 4 is an illustration showing a configuration example of a preprocess cache stored on the main memory shown in FIG. 1. The preprocess cache is managed by the cache manager 111 of the EPD update controller 110 shown in FIG. 2.

As shown in FIG. 4, the preprocess cache is constructed from a plurality of cache entries. In an example shown in FIG. 4, six cache entries are registered as preprocess caches. Each cache entry includes a pair of a tag part and a preprocess cache data part.

The tag part includes a pair of an update-data ID and an update-method tag and a valid bit. An update-request of EPD issued by application software, middleware, or the like, is issued while having the pair of the update-data ID for identifying update-data and the update-method tag indicating the kind of update to be expected being added to. The cache determining unit 112 receiving such update-request executes determination of cache-hit (cache determination). In the cache determination, by searching tag parts in the cache entries, it is determined whether there is an entry in which a pair of an update-data ID and an update-method tag is matched with the one in the update-request and a valid bit indicating whether data of a corresponding cache entry is valid or invalid indicates valid.

The update-data ID is information for identifying update-data. In an update-process using the same update-data while application software or middleware manages update-data and an update-data ID with association between them, for instance, an update-request with the same update-data ID is issued to the EPD update controller 110. In the example shown in FIG. 4, there are four kinds of update-data "1" to "4".

The update-data tag is information to be added to an update-request in order to specify an update-method. For example, the update-data tag specifies an update-method including binarization of update-data, an update-method including binarization of update-data and inversion of the binarized update-data, a gray-scale update-method with which residual image scarcely remains, an update-method with which update-speed is fast but residual image can easily occur, a combination of two or more of such methods, or the like. In the example shown in FIG. 4, as for update-data of which update-data ID are "1" and "2", two kinds of update-methods "B" and "W" have been specified previously and are being registered in the preprocess cache.

Here, for instance, the update-method "B" specifies that update is executed after binarizing update-data, the update-method "W" specifies that update is executed after binarizing update-data and inverting the binarized update-data, and the update-method "G" specifies that update is executed after converting update-data into gray-scale update-data. In the update-method "G" in which update-data is converted into gray-scale update data, when a gradation of the update-data is analyzed as eight shades of gray, update-control information for updating with eight shades of gray is selected. In this case, the same image quality as that of sixteen shades of gray can be obtained with short update time and low power consumption without using update-control information with sixteen shades of gray.

To the update-request of the EPD 140 issued by application software, middleware, or the like, instead of the pair of the update-data ID and the update-method tag, it is possible that an ID for identifying the pair of the update-data ID and the update-method tag is added. In a case of FIG. 4, for instance, it is possible that an ID of <1, B> is set as "1", an ID of <1, W> is set as "2", an ID of <2, B> is set as "3", an ID of <2, W> is set as "4", an ID of <3, G> is set as "5", and an ID of <4, G> is set as "6". In such case, for <UPDATE-DATA ID, UPDATE METHOD TAG> in the tag part, an ID for identifying the pair is registered instead. This is the same in the other embodiments.

The preprocess cache data part include a pair of an update-control-information selection ID and preprocessed update-data.

The update-control-information selection ID is information for specifying a single update-control information from among a plurality of update-control information stored in the data processing device 1. When the updating unit 114 instructs the EPD controller 105 to execute an update-process of the EPD 140 using the entry of which update-control-information selection ID is "34" shown in FIG. 4, the EPD controller 105 reads out thirty-fourth update-control information arranged on the main memory 120, and executes an update-process using the update-control information.

In the preprocessed update-data, in addition to content data (content) of the preprocessed update-data, a data size thereof is also included.

Figure 5:
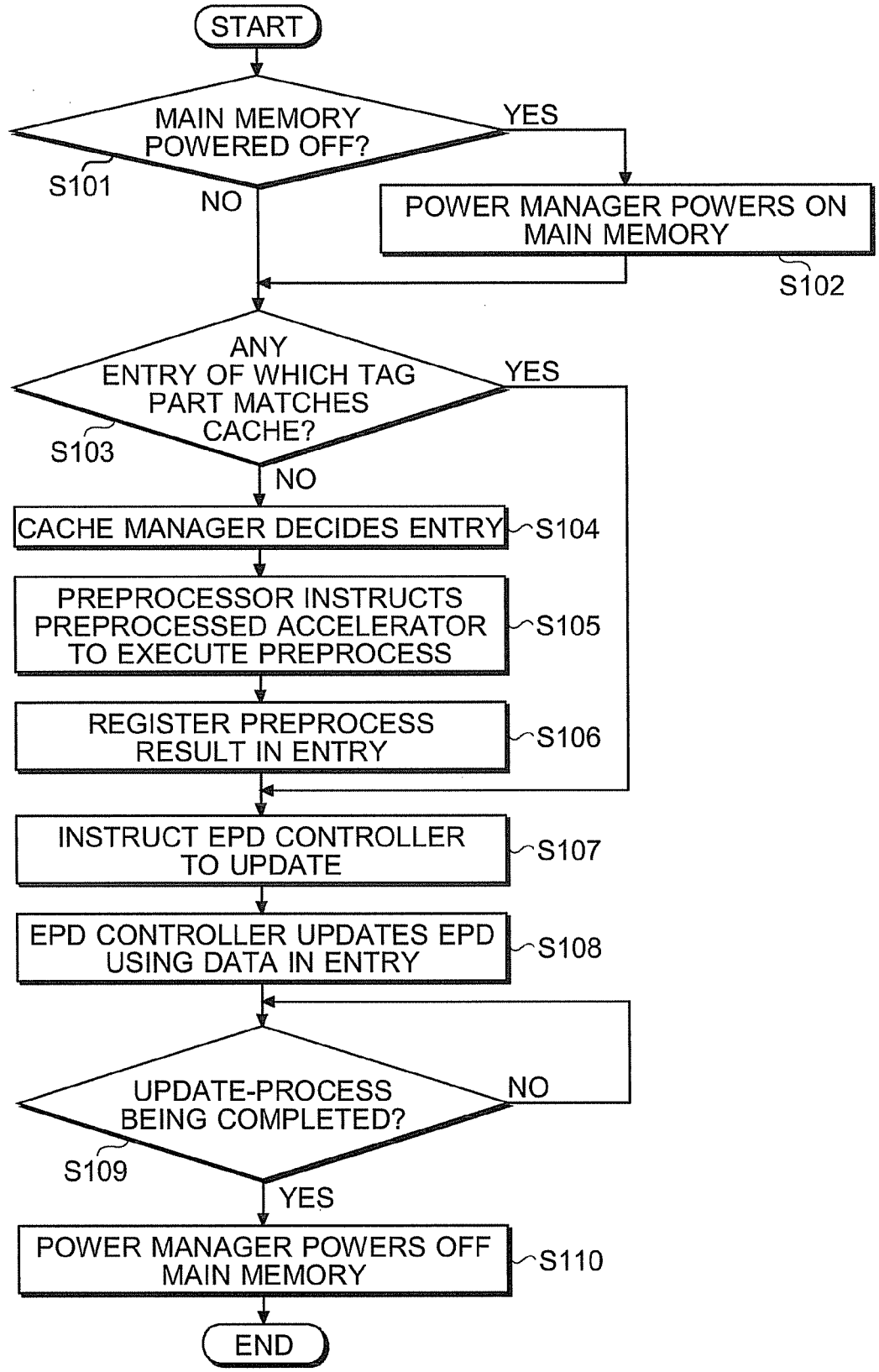
FIG. 5 is a flowchart showing an example of update-process according to the first embodiment.

FIG. 5 is a flowchart showing an example of an update-process according to the first embodiment. FIG. 5 shows an example in which power-saving and speeding-up of the update-process is achieved by the EPD update controller 110 reusing data on the preprocess cache. The process shown in FIG. 5 starts when application software, middleware, or the like, issues an update-request for updating the EPD 140 using update-data located on a frame buffer on the main memory 120, or the like, to the EPD update controller 110.

As shown in FIG. 5, in the update-process, when the EPD update controller 110 receives an update-request, the power manager 115 of the EPD update controller 110 confirms whether the main memory 120 is powered off or not for the purpose of aggressive power-saving (step S101). When the main memory 120 is powered off (step S101; YES), the power manager 115 powers on the main memory 120 using the power control device 150A (step S102), and the EPD update controller 110 progresses to step S103. Thereby, access to the main memory 120 is permitted. Because the main memory 120 is a non-volatile memory such as a MRAM, data on a preprocess cache formed on the main memory 120 is maintained. On the other hand, when the main memory 120 is powered on (step S101; NO), the EPD update controller 110 directly progresses to step S103.

In step S103, the cache determining unit 112 of the EPD update controller 110 checks whether a cache entry which matches a pair of an update-data ID and an update method tag added to the update-request exists on the preprocess cache or not (cache determination) (step S103), and when the cache entry exists (step S103; YES), the EPD update controller 110 progresses to step S107. On the other hand, when the cache entry does not exist (step S103; NO), the cache manager 111 of the EPD update controller 110 decides a cache entry for registering a preprocess result (step S104). In this way, when the preprocess cache is filled with cache entries, the cache manager 111 decides the cache entry using an algorithm such as LRU (least recently used) for determining a cache entry to be replaced. Next, the preprocessor 113 of the EPD update controller 110 instructs the preprocess accelerator 102 to execute a preprocess (step S105).

The preprocess accelerator 102 executes the preprocess including an above-described processing step and selecting step based on the update-data on the main memory 120 in a response to the instruction from the preprocessor 113. After that, the preprocess accelerator 102 registers a preprocessed update-data being a result of the preprocess to the decided cache entry (step S106). Furthermore, the cache manager 111 registers an update-control-information selection ID being another result of the preprocess in the same cache entry (step S106). At the same step, the cache manager 111 also registers information about an update-data ID, an update-method tag and a valid bit (valid) of the tag part on the same cache entry (step S106). After that, the EPD update controller 110 progresses to step S107.

In step S107, the updating unit 114 of the EPD update controller 110 requests the EPD controller 105 to execute a drawing process directed to the EPD 140 while using the data registered on the preprocess cache (step S107). In response to this, the EPD controller 105 reads out update-control information corresponding to the update-control-information selection ID from the preprocess cache of the main memory 120 and the preprocessed update-data registered on the same cache, and executes the drawing process directed to the EPD 140 (step S108). After that, the EPD update controller 110 waits for completion of the update-process (step S109; NO). When the completion of the update-process is notified by an interruption handling, or the like (step S109; YES), the power manager 115 of the EPD update controller 110 powers off the main memory 120 using the power control device 150A (step S110). Thereby, power consumption is reduced. After that, the EPD update controller 110 finishes this operation.

As described above, by registering the preprocess result as the preprocess cache, it is possible to drastically reduce memory access to the main memory 120. As a result, it is possible to drastically reduce the power consumption and process time.

In the first embodiment, although the update-control-information selection ID being one of the preprocess results is stored on the preprocess cache, it is also possible that the update-control information itself is registered on the preprocess cache instead of the update-control-information selection ID. In such case, the process of reading out the update-control information based on the update-control-information selection ID is added before the process of registering the preprocess result in the cache entry (step S106). This is the same in the other embodiments.

In the first embodiment, although the case where the main memory 120 is a non-volatile memory is explained as an example, it is also possible that the main memory 120 is a volatile memory such as a DRAM. In such case, during idle time during which a process such as the drawing process directed to the EPD 140 is not executed, in order to maintain the data on the preprocess cache while reducing power consumption, it is possible to set a DRAM controller so as to be able to use a power-saving mode, such as a self-refresh mode of a DRAM, enabling to reduce the power consumption while maintaining data. This is the same in the other embodiments.

During idle time after complication of the drawing process directed to the EPD 140, it is possible to instruct the power control device 150B to stop supplying power while letting the power control device 150B itself switched to the power-saving mode. Furthermore, it is also possible to execute power gating of modules in the SoC 100 such as the EPD controller 105, stop supplying clocks, or the like. This is the same in the other embodiments. In addition, the first embodiment can be applied to a configuration without the preprocess accelerator 102.

In the first embodiment, although the preprocess accelerator 102 executes the preprocess, it is also possible that the CPU 101 or the EPD controller 105 executes the preprocess, or the CPU 101 and the EPD controller 105 share the preprocess. This is the same in the other embodiments.

The process of registering the entry of the preprocess cache is not limited to the above-described method, it is also possible that the preprocess accelerator 102 executes all of the process, or the CPU 101 and the preprocess accelerator 102 share the process. This is the same in the other embodiments.

In the first embodiment, although the EPD controller 105 integrated in the SoC 100 is used, it is also possible to use an external EPD controller with respect to the SoC 100.

FIG. 4 shows one example of the configuration of the cache entry of the preprocess cache, and it is not limited to such configuration. For instance, due to a configuration in which display region of the EPD 140 can be partially updated, there is a case where sizes of the preprocessed update-data to be cached on the preprocess cache data part are different depending on the entries.

Specifically, as update-data, for instance, there are various data from large-size data such as data of a whole single page in an electronic book application to small-size data such as data of a page number of a current page, data of a software button to be displayed on the EPD 140 by application software in order to be selected by a use of the data processing device 1 using a touch panel, and image data of each choice item in user interface such as a menu, a list, or the like. Therefore, to a region for registering the preprocessed update-data in each entry shown in FIG. 4, it is also possible to store a pointer in C language, or the like, address information indicating another region, or the like, instead of the preprocessed update-data. In such case, the region for actually registering the preprocessed update-data is another region indicated by the pointer, the address information, or the like. Here, by utilizing a characteristic in which the EPD 140 can be partially updated, it becomes possible to update a screen by the preprocess cache storing a partial preprocessed update-data being an update target without having the preprocess cache store the preprocessed update-data of the whole screen. This is important characteristic of the preprocess cache for EPD. This is the same in the other embodiments.

In the first embodiment, update of small-data image such as a button drawn on the EPD 140 as user interface is cached in a preprocess. By such configuration, according to characteristics of the EPD 140 and the EPD controller 105, there is a case where update time (a period that starts from the point the EPD controller 105 starts an actual update-process to the point the EPD controller 105 finishes the process) does not widely change depending on a data size of update-data (hereinafter referred to as update-size). Therefore, in a case where the data processing device 1 transits to a standby mode with low power consumption for the purpose of reducing the power consumption after complication of update, power-saving effect in a case with small update-size becomes equal to that in a case with large update-size. Therefore, caching by the preprocess cache in update with small data-size is very important. Furthermore, a button, each key of a keyboard, or the like, makes a large impact on user in response performance. Therefore, by caching as described above, it is possible to improve usability.

In the first embodiment, as for update-data for which preprocess has been executed once, although the preprocess result is stored on the preprocess cache, it is not limited to such configuration. For example, as for update-data of which frequent use is easily predicted, such as a home screen to be displayed at a time of boot of the data processing device 1, a menu and a list, an image of each key button of a software keyboard, software pieces being able to be shared by one or more application software, or the like, it is possible to previously execute preprocesses for them and previously register preprocess results on the data processing device 1. Here, the term "previously" may mean before shipping, at a time of installing, at a time of software update, or the like. The preprocess results previously registered are registered on the preprocess cache at a time of boot or cold boot of the data processing device 1, at a time of boot of application software, or the like. Thereby, as for a specific update-data, it is possible to reduce the power consumption in a very first update process. This is the same in the other embodiments.

In the first embodiment, although the power control device 150A powers the main memory 120 and the SoC 100 and the power control device 150B powers the EPD 140, it is not limited to such configuration. For example, the power control device 150A can power the main memory 120, the SoC 100 and the EPD 140. This is the same in the other embodiments.

In the first embodiment, the processing step in the preprocess can includes a process for creating update-data by an accelerator such as a GPU (graphics processing unit), the CPU 101, or the like. The process for creating update-data may include a rendering process in a PDF (portable document format) data or a web browser. This is the same in the other embodiments.

Second Embodiment

Next, a data processing device, a display control device, a semiconductor chip, a method of controlling display device, and a computer-readable medium according to a second embodiment will be described in detail with the accompanying drawings. In the following, for the same configurations as in the above-described embodiment(s), redundant explanations will be omitted by referring to them using the same reference numbers.

Figure 6:
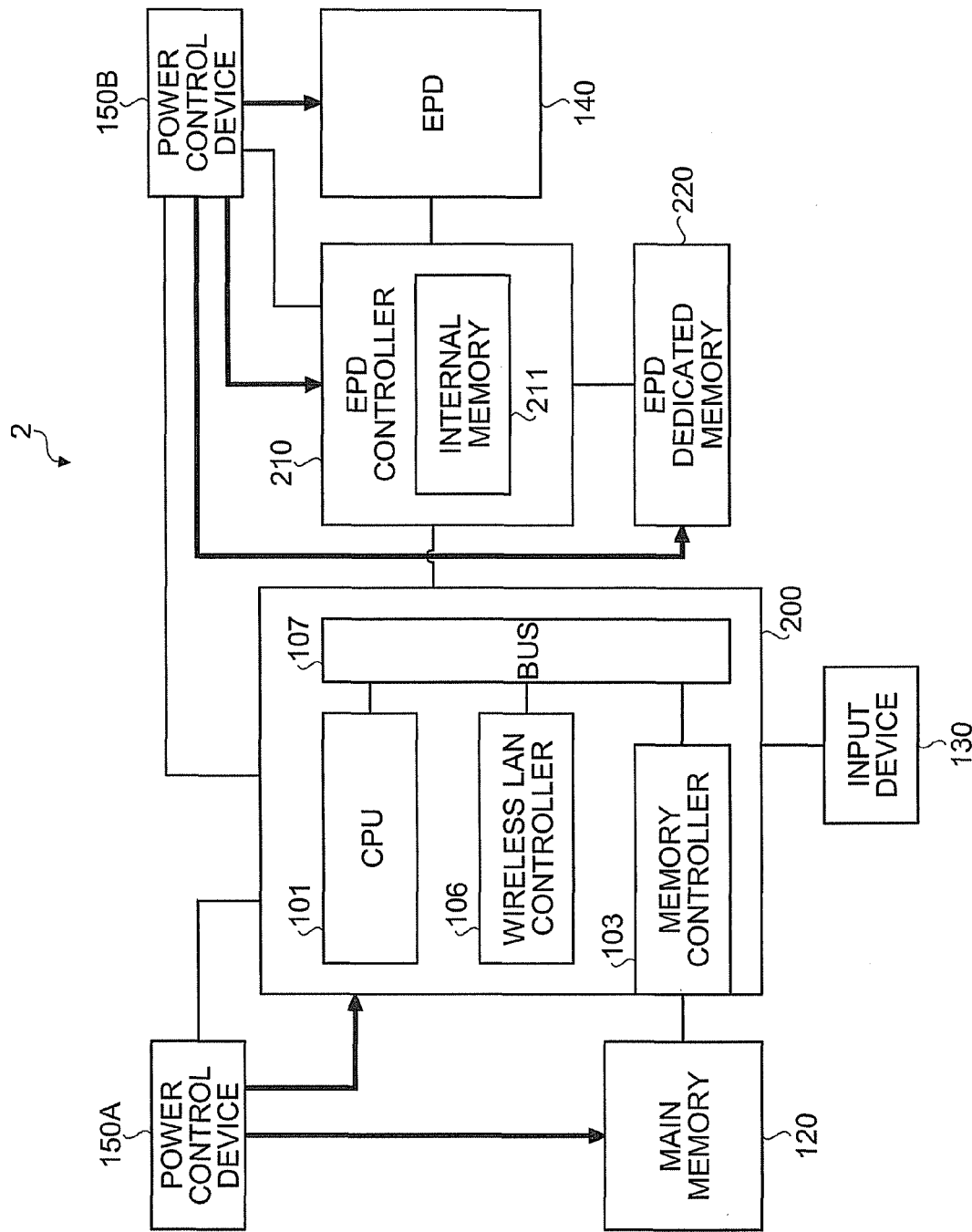
FIG. 6 is a block diagram showing an outline configuration of a data processing device according to a second embodiment.

FIG. 6 is a block diagram showing an outline structure of a data processing device according to the second embodiment. As shown in FIG. 6, a data processing device 2 has a SoC 200, the main memory 120, the EPD 140, an EPD controller 210, an EPD dedicated memory 220, the power control devices 150A and 150B, and the input device 130. As described above, the data processing device 2 has the same configuration as the data processing device 1 according to the first embodiment, except that the EPD controller 210 is separated from the SoC 200 and the EPD dedicated memory 220 for registering data for an update-process is arranged in the EPD controller 210.

The power control device 150B powers the EPD controller 210 and the EPD dedicated memory 220 in addition to the EPD 140. Power supply to the EPD controller 210, or the like, may be conducted by the power control device 150A which powers the main memory 120, the SoC 200, and so on.

As the first embodiment, the main memory 120 is a non-volatile memory such as a MRAM. On the main memory 120, update-data to be displayed on the EPD is stored. The update-data is forwarded to the EPD dedicated memory 220 before an update-process is executed.

The EPD dedicated memory 220 may be a non-volatile memory such as a MRAM. The EPD dedicated memory 220 can be used as a working memory by the EPD controller 210.

The SoC 200 includes the bus 107, the CPU 101, the memory controller 103, the wireless LAN controller 106, and so forth. The SoC 200 can include the preprocess accelerator 102 as the first embodiment.

In the second embodiment, contrary to the first embodiment, the EPD controller 210 executes a preprocess and a drawing process (step). That is, in the second embodiment, the EPD controller 210 works as an EPD update controller. The EPD controller 210 includes an internal memory 211 such as a non-volatile MRAM. On the internal memory 211, a preprocess cache constructed from a pair of the preprocessed update-data and the update-control-information selection ID are stored. However, the update-control information can be stored on the internal memory 211.

Figure 7:
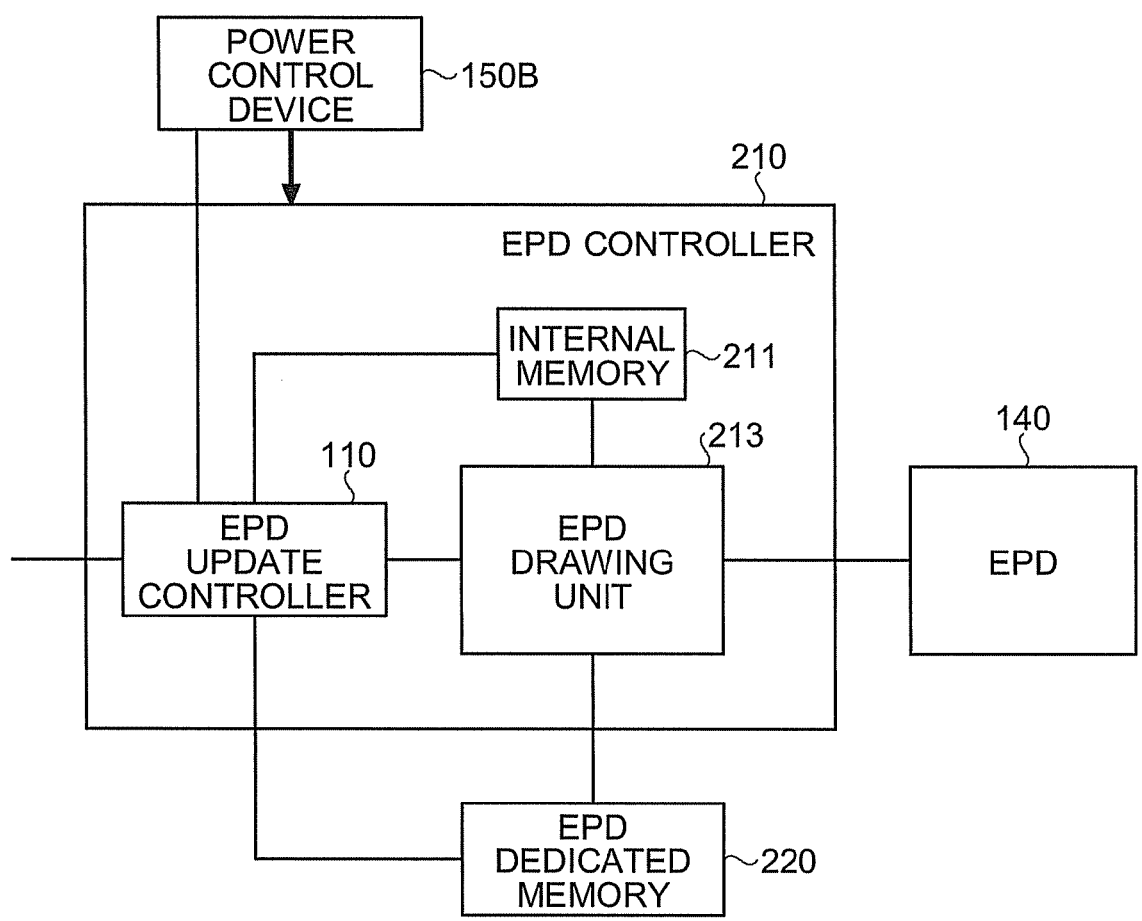
FIG. 7 is a block diagram showing an outline configuration of an EPD update-control device according to the second embodiment.

A basic configuration of an EPD update controller according to the second embodiment is the same as the EPD update controller 110 (see FIG. 2) according to the first embodiment. An example of the EPD update controller 110 in the EPD controller 210 is shown in FIG. 7. When the EPD update controller 110 receives an update-request for a part or all of the EPD 140 from application software, middleware, or the like, the EPD update controller 110 checks whether a result of a preprocess of an update-process using the same update-data and the same update-control information hits a preprocess cache structured on the internal memory 211 of the EPD controller 210 or not (cache determination). When the result hits the processes cache, the EPD update controller 110 instructs an EPD drawing unit 213 to execute an update-process of the EPD 140 while reusing data on the preprocess cache. Thereby, it is possible to reduce the power consumption and process time for the preprocess. Furthermore, by omitting the preprocess, it is possible to maintain the EPD dedicated memory 220 powering off, whereby it is possible to further reduce the power consumption. A configuration of the preprocess cache stored on the internal memory 211 of the EPD controller 210 is the same as the preprocess cache exampled in the first embodiment (see FIG. 4).

Figure 8:
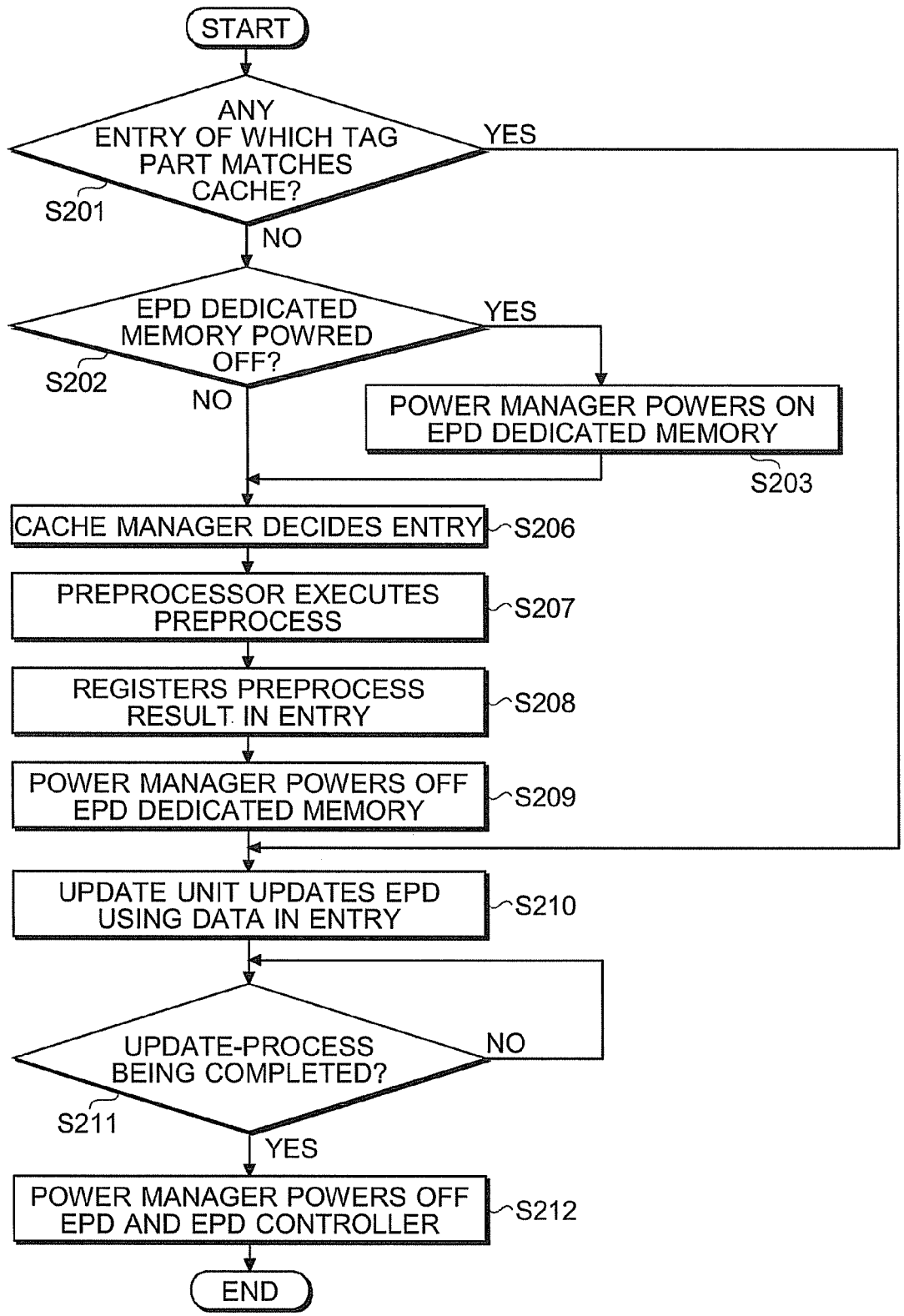
FIG. 8 is a flowchart showing an example of update-process according to the second embodiment.

FIG. 8 is a flow chart showing an example of an update-process according to the second embodiment. When an update-request for updating the EPD 140 with the update-data stored on the main memory 120 is issued to a device driver of the EPD controller 210, an operation shown in FIG. 8 is started according to an instruction from a device driver of the EPD controller 210 after the update-data is forwarded from the main memory 120 to the EPD dedicated memory 220. At this time, when power supply to the EPD controller 210, the EPD dedicated memory 220 and the main memory 120 is stopped for the purpose of aggressive power-saving, a restart of power supply to the EPD controller 210, the EPD dedicated memory 220 and the main memory 120 is instructed to the power control devices 150B and 150A by the device driver of the EPD controller 210, or the like. When the update-data is already stored on the EPD dedicated memory 220, there is no necessity of forwarding the update-data from the main memory 120, and therefore, there is no necessity of powering the main memory 120. Furthermore, at this time, also there is no necessity of powering the EPD dedicated memory 220. After forwarding the update-data to the EPD dedicated memory 220, the power control device 150A can be instructed to stop power supply to the main memory 120. Because the internal memory 211 on the EPD controller 210 is a non-volatile memory, data on the preprocess cache structured on the internal memory 211 is maintained.

As shown in FIG. 8, in the update-process, when the power supply to the EPD controller 210 is restarted based on reception of the update-request, the cache determining unit 112 of the EPD update controller 110 checks whether a cache entry which matches to a pair of an update-data ID and an update method tag added to the update-request exists on the preprocess cache or not (cache determination) (step S201), and when the cache entry exists (step S201; YES), the EPD update controller 110 progresses to step S210. On the other hand, when the cache entry does not exist (step S201; NO), the power manager 115 of the EPD update controller 110 checks whether the EPD dedicated memory 220 is powered off for a purpose of aggressive power-saving or not (step S202). When the EPD dedicated memory 220 is powered off (step S202; YES), the power manager 115 powers on the EPD dedicated memory 220 using the power control device 150B (step S203), and the EPD update controller 110 progresses to step S206. Thereby, access to the EPD dedicated memory 220 is permitted. On the other hand, when the EPD dedicated memory 220 is powered on (step S202; NO), the EPD update controller 110 directly progresses to the step S206.

In step S206, the cache manager 111 of the EPD update controller 110 decides a cache entry for registering a preprocess result (step S206). In this way, when the preprocess cache is filled with cache entries, the cache manager 111 decides the cache entry using an algorithm such as LRU for determining a cache entry to be replaced. Next, the data converter 113a and the selector 113b in the preprocessor 113 of the EPD update controller 110 execute a preprocess (step S207), and registers the preprocessed update-data being a result of the preprocess on the decided cache entry (step S208). Furthermore, the cache manager 111 registers the update-control-information selection ID being another result of the preprocess in the same cache entry (step S208). At the same step, the cache manager 111 also registers the information about the update-data ID, the update-method tag and the valid data (valid) of the tag part on the same cache entry (step S208). Here, when the preprocess accelerator 102 is being arranged, it is possible that the preprocessor 113 issues an instruction of preprocess to the preprocess accelerator 102 and the preprocess accelerator 102 executes the preprocess.

Next, the power manager 115 of the EPD update controller 110 powers off the EPD dedicated memory 220 after use (step S209), and the EPD update controller 110 progresses to step S210.

In step S210, the updating unit 114 of the EPD update controller 110 executes the drawing process directed to the EPD 140 while using the data registered on he preprocess cache (step S210). After that, the EPD update controller 110 waits for completion of the update-process (step S211; NO). When the completion of the update-process is notified by an interruption handling, or the like (step S211; YES), the power manager 115 of the EPD update controller 110 powers off the EPD 140 and the EPD controller 210 using the power control device 150B (step S212). Thereby, power consumption is reduced. Because the internal memory 211 is a non-volatile memory, data cached in the internal memory 211 is maintained even if the EPD controller 210 is powered off. Furthermore, because the EPD 140 is a non-volatile memory display, the image drawn on the EPD 140 is kept maintained. After which, the EPD update controller 110 finishes this operation.

As described above, by registering the preprocess result as the preprocess cache, it is possible to drastically reduce memory access to the EPD dedicated memory 220. As a result, it is possible to drastically reduce the power consumption and process time.

In the second embodiment, although the preprocess cache is stored on the internal memory 211 of the EPD controller 210, it is also possible that the preprocess cache is registered on the EPD dedicated memory 220 or both the internal memory 211 and the EPD dedicated memory 220. At this time, on the internal memory 211, a preprocess cache expected for frequent can be registered. Furthermore, in the second embodiment, although all of the update-control information is stored on the internal memory 211, it is also possible that all or a part of the update-control information is stored on the EPD dedicated memory 220. At this time, on the internal memory 211, a preprocess cache expected for frequent can be registered. This is the same in the other embodiments.

In the second embodiment, although the case where the EPD dedicated memory 220 and the internal memory 211 of the EPD controller 210 are non-volatile memories in addition to the main memory 120 is explained as an example, it is also possible that the EPD dedicated memory 220 and the internal memory 211 of the EPD controller 210 are volatile memories. In such case, during idle time during which a process such as the drawing process directed to the EPD 140 is not executed, in order to maintain the data on the preprocess cache while reducing power consumption, it is possible to use a power-saving mode, such as a self-refresh mode of a DRAM, enabling to reduce the power consumption while maintaining data, and it is also possible to supply power only to the internal memory 211 of the EPD controller 210. This is the same in the other embodiments.

As described above, the structure in that the EPD controller 210 is separated from the SoC 200 is not limited while it is also possible that the EPD controller 105 of the SoC 100 in the first embodiment executes the same operation as the EPD controller 210 of the second embodiment. In such case, it is possible that the EPD controller 105 has the internal memory 211 or the internal memory 104 is used instead of the internal memory 211.

As shown in the example, due to the characteristic that a display of the EPD 140 can be partially updated, an update-size of the preprocessed update-data cached on the preprocess cache data part may often be different by entries. Therefore, a kind of configuration in that a region for registering the preprocessed update-data of each cache entry shown in FIG. 4 includes address information indicating another region actually storing the data is also acceptable. This is the same in the other embodiments.

Third Embodiment

Next, a data processing device, a display control device, a semiconductor chip, a method of controlling display device, and a computer-readable medium according to a third embodiment will be described in detail with the accompanying drawings. In the following, for the same configurations as in the above-described embodiment(s), redundant explanations will be omitted by referring to them using the same reference numbers.

A data processing device according to the third embodiment can have the same configuration as the data processing device 1 according to the first embodiment (see FIG. 1), for instance. However, in the third embodiment, the preprocess cache is arranged in the non-volatile internal memory 104 of the SoC 100. By arranging the preprocess cache in the non-volatile internal memory 104 of the SoC 100, there is no necessity of accessing the main memory 120 being a non-volatile memory when a result of a preprocess hits the preprocess cache, it is possible to update the EPD 140 while the main memory 120 is kept powered-off. As a result, it is possible to prolong a period for powering off the main memory 120, whereby, it is possible to further reduce the power consumption. Furthermore, because the internal memory 104 in the SoC 100 is an on-chip memory, it is possible to realize a high-speed access compared with the main memory 120. Thereby, it is possible to prolong the processing time of update-process, whereby, it is possible to further reduce the power consumption.

The SoC 100 according to the third embodiment can receive an interruption from the input device 130 being a touch panel, a keyboard, a button or a key specialized for a specific process incorporated in the data processing device 2, or the like, while the SoC 100 is operating in a standby mode with low power consumption.

The internal memory 104 is a non-volatile memory such as a MRAM. In the third embodiment, on the internal memory 104, the preprocess cache constructed from a pair of the preprocessed update-data and the update-control-information selection ID are stored. A base configuration of a preprocess cache can be the same as the preprocess cache shown in FIG. 4. Also the update-control information is located on the internal memory 104. Furthermore, an interrupt vector table and an interrupt handler for EPD-update which issues the update-request of the update-process registered on the interrupt vector table to the device driver of the EPD controller 210 are located on the internal memory 104. On the main memory 120, as the first embodiment, the update-data to be displayed on the EPD 140 is located.

A base configuration of an EPD update controller according to the third embodiment is the same as the EPD update controller 110 according to the first embodiment shown in FIG. 2. The cache determining unit 112 is located on the internal memory 104 by a process of the interrupt handler for EPD-update. The preprocessor 113, the updating unit 114, the cache manager 111 and the power manager 115 are parts of the device driver of the EPD controller 210, and they are located on the internal memory 104. Here, a part of these configurations can be located on the main memory 120.

Figure 9:
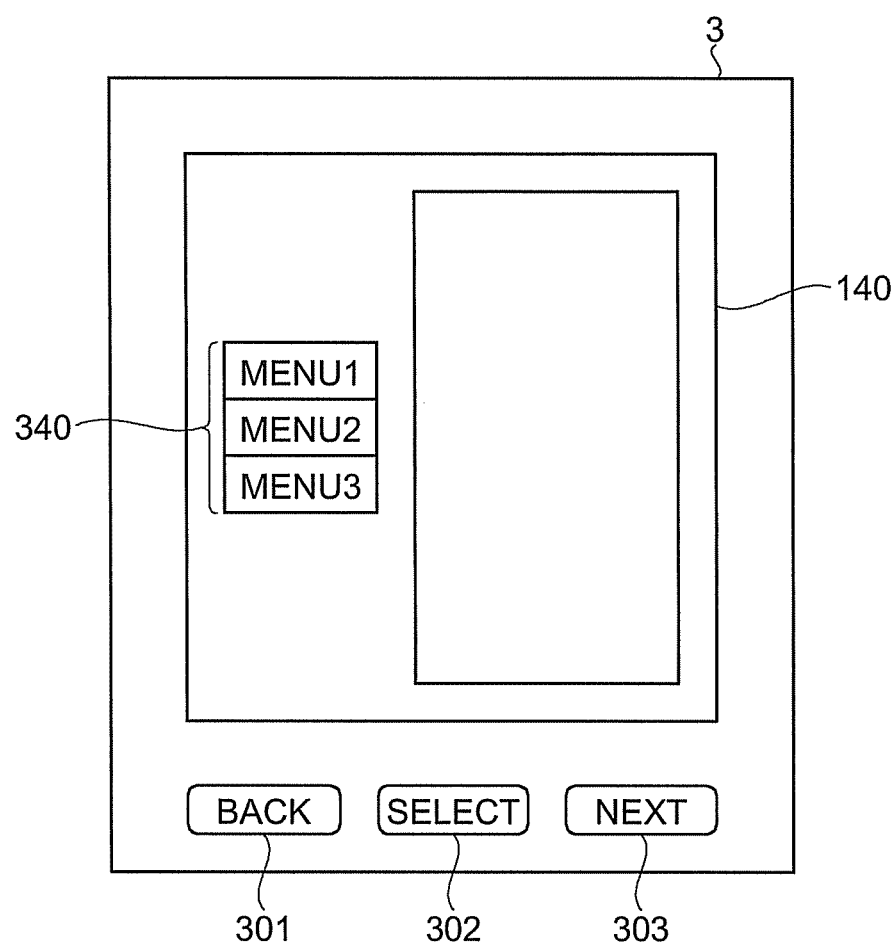
FIG. 9 is a block diagram showing an outline configuration of a data processing device according to a third embodiment.

FIG. 9 is a block diagram showing an outline configuration of a data processing device according to the third embodiment. As shown in FIG. 9, at the data processing device 3, for instance, a BACK key 301, a SELECT key 302 and a NEXT key 303 are arranged. On the EPD 140 of the data processing device 3, a menu 340 including three selection items are displayed by software. In the third embodiment, the update-process starts when an interrupt handler for EPD-update on the internal memory 104 boots in response to an occurrence of interruption due to user of the data processing device 3 inputting a key of a keyboard or a key specialized for a specific process. Here, as premises, for instance, the interrupt handler for EPD-update is linked to a specific key. For example, the interrupt handler for EPD-update is linked to the NEXT key 303 and the BACK key 301 for shifting a focus for anterior and posterior selection items in the menu 340 displayed on the EPD 140 by application software and for displaying the back or next page in an electronic book application, respectively. The NEXT key 303 is assigned a specific update-data ID=1000 reserved by application software, middleware, or the like. Here, because there are three selection items in the menu 340, the interrupt handler for EPD-update linked to the NEXT key 303 may have a condition variable which can vary from '0' to '2'. In such case, update-data IDs from the one-thousandth to the one-thousand-second are reserved.

Figure 10:
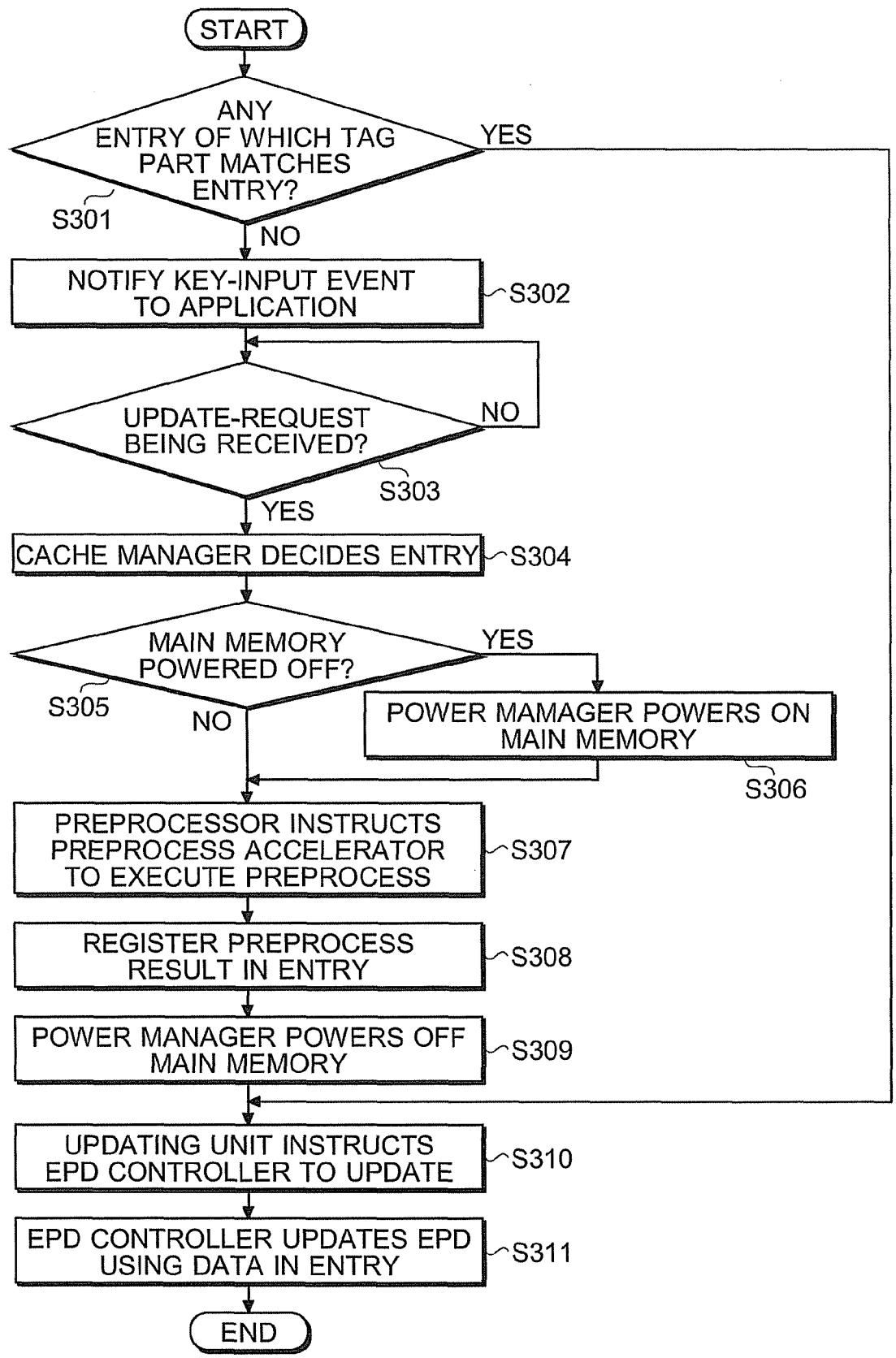
FIG. 10 is a flowchart showing an example of update-process according to the third embodiment.

FIG. 10 is a flow chart showing an example of an update-process according to the third embodiment. An operation shown in FIG. 10 is intended for enabling power-saving and speeding-up of the update-process by reusing data on the preprocess cache, and is executed in the following manner. That is, when an interruption to the SoC 100 happens by a key of a keyboard being inputted, the corresponding interrupt handler for EPD-update boots. In the interrupt handler for EPD-update, a specific update-data ID (1000-th, for instance) and an update-method tag previously assigned to each key by the cache determining unit 112 are directly used or a result of calculation based on the update-data ID and a condition variable thereof is used. The condition variable indicates which selection item in the menu is focused (for instance, when a third selection item is focused, the condition variable is 1002-th=1000+2), for example. Furthermore, the calculation is a process in that the specific update-data ID will have the condition variable decremented in response to an interruption by the BACK key, for instance (for instance, 1002−1=1001-th), whereby the focus is shifted to an anterior selection item.

In the operation shown in FIG. 10, the cache determining unit 112 of the EPD update controller 110 checks whether a cache entry which matches to a pair of the obtained update-data ID and the obtained update method tag exists on the preprocess cache or not (cache determination) (step S301), and when the cache entry exists (step S301; YES), the EPD update controller 110 progresses to step S310. On the other hand, when the cache entry does not exist (step S301; NO), the cache determining unit 112 notifies a key-input event to application software, or the like (step S302). After that, a process corresponding to the key-input event is executed by application software, and the EPD update controller 110 waits until an update-request is received from the application software (step S303; NO).

To the update-request received from the application software, the reserved update-data ID (from 1000-th to 1002-th) is added. Therefore, the cache determining unit 112 can determine that the cache entry does not exist in the preprocess cache (cache-miss) without executing the cache determination. Accordingly, when the EPD update controller 110 is received the update-request from the application (step S303; YES), the cache manager 111 of the EPD update controller 110 decides a cache entry for registering the preprocess result (step S304). In this way, when the preprocess cache is filled with cache entries, the cache manager 111 decides the cache entry using an algorithm such as LRU for determining a cache entry to be replaced.

Next, the power manager 115 of the EPD update controller 110 confirms whether the main memory 120 is powered off or not for the purpose of aggressive power-saving (step S305). When the main memory 120 is powered off (step S305; YES), the power manager 115 powers on the main memory 120 using the power control device 150A (step S306), and the EPD update controller 110 progresses to the step S307. Thereby, access to the main memory 120 is permitted. Because the main memory 120 is a non-volatile memory such as a MRAM, data of a preprocess cache structured on the main memory 120 is maintained. On the other hand, when the main memory 120 is powered on (step S305; NO), the EPD update controller 110 directly progresses to step S307.

In step S307, because the result of the cache determination does not hits the preprocess cache (cache-miss), the preprocessor 113 of the EPD update controller 110 instructs the preprocess accelerator 102 to execute the preprocess (step S307).

The preprocess accelerator 102 executes the preprocess including an above-described processing step and selecting step based on the update-data on the main memory 120 in a response to the instruction from the preprocessor 113. After that, the preprocess accelerator 102 rewrites a preprocessed update-data being a result of the preprocess to the decided cache entry (step S308). Furthermore, the cache manager 111 registers information about an update-control-information selection ID being another result of the preprocess, and an update-data ID, an update-method tag and a VALID bit (VARID) of the tag part in the same cache entry (step S308). After that, the power manager 115 of the EPD update controller 110 powers off the main memory 120 using the power control device 150A (step S309), and the EPD update controller 110 progresses to step S310.

In step S310, the updating unit 114 of the EPD update controller 110 requests the EPD controller 105 to execute a drawing process directed to the EPD 140 while using the data registered on the preprocess cache (step S310). In response to this, the EPD controller 105 reads out update-control information corresponding to the update-control-information selection ID from the preprocess cache of the main memory 120 and the preprocessed update-data registered on the same cache, and executes the drawing process directed to the EPD 140 (step S311). After that, the EPD update controller 110 finishes this operation.

In the third embodiment, because of the premise in that the specific interruption is determined by the cache determining unit 112 of the interrupt handler for EPD-update, it is possible to omit the determination process by fixing the determination result for the update-request with the assigned update-data ID issued in step S304 to a cache-miss. Furthermore, by arranging such that the determination process is executed by another cache determining unit incorporated in a driver of the EPD controller 210 after the update-request is notified, it is possible to omit the preprocess as in the first embodiment with respect to those interruption other than the specific interruption. As the result, it is possible to achieve further power-saving and speeding-up.

Moreover, for instance, when a controller such as a microcontroller with lower power than the SoC 100 is arranged between the input device 130 and the SoC 100, the controller is powered from some place other than the power control device 150A, and the controller can control the SoC 100 and the power control device 150A, it is possible to conduct aggressive power-saving by executing hibernation in that the controller stops supplying power to the SoC 100 and the power control device 150A itself powers off during idle time after complication of the drawing process of step S311. In such case, because the internal memory 104 of the SoC 100 is a non-volatile memory, after a restore process leaded by the controller, data of a preprocess cache is maintained. Therefore, after resuming from idling, it is possible to execute the update-process of the EPD 140 with high-speed. Furthermore, when the internal memory 104 of the SoC 100 is a volatile memory such as a SRAM, hibernation may be executed after the preprocess cache on the internal memory 104 is saved to the non-volatile main memory 120. It is also possible to let only the internal memory 104 being a SRAM, or the like, powered on while letting the EPD 140 powered off. These are the same in the other embodiments.

Moreover, in the third embodiment, although a specific interrupt handler for EPD-update, a specific update-data ID and a specific update-method tag are previously arranged for an interruption, a correspondence relationship therebetween can be dynamically varied at a time of booting the application software.

In the third embodiment, although it is arranged such that all the preprocess cache is located on the internal memory 104 of the SoC 100, there is no necessity of locating the all the preprocess cache on the internal memory 104 while it is also possible to locate a part of the preprocess cache on the main memory 120. In such case, by preferentially locating frequently-used cache entry, or the like, on the internal memory 104 for the purpose of suppressing the number of executions of powering-on the main memory 120, it is possible to optimize the power consumption and the process speed.

Moreover, in the third embodiment, although the entire update-control information is located on the internal memory 104, it is also possible to locate a part of the update-control information on the main memory 120. In this way, the internal memory 104 can be used as a cache for a frequently-used update-control information.

In the third embodiment, although the EPD controller 210 integrated in the SoC 100 is used, it is also possible to use an external EPD controller with respect to the SoC 100.

Furthermore, as for an extremely-frequently-used update-data in which content to be displayed is static as a menu screen, it is acceptable that the update-control-information ID and the preprocessed update-data being the preprocess results are previously registered on the preprocess cache on the internal memory 104. In such case, because it is possible to skip the processes of step S302 to S309 in FIG. 10, it is possible to obtain a high power-saving effect. Here, the term "previously" may mean at a time of boot of application software, a time of cold boot of the data processing device 3, before shipping, or the like.

Fourth Embodiment

Next, a data processing device, a display control device, a semiconductor chip, a method of controlling display device, and a computer-readable medium according to a fourth embodiment will be described in detail with the accompanying drawings. In the following, for the same configurations as in the above-described embodiment(s), redundant explanations will be omitted by referring to them using the same reference numbers.

A data processing device according to the fourth embodiment has the same configuration as the data processing device 2 according the second embodiment (see FIG. 6) in which the tag part of the preprocess cache is located on the internal memory 104 of the EPD controller 210 except that a controller with power consumption lower than that of the SoC 200 is arranged between one or more input device 130 such as a keyboard, a touch panel, or the like, and the SoC 200. The controller is powered from some place other than the power control device 150A and the SoC 200, and can control the SoC 200 and the power control device 150A.

When the controller receives a request of interruption handling from a keyboard, or the like, the controller determines whether a preprocess cache of an update-process corresponding to the interruption exists or not, and when the corresponding preprocess cache exists (cache-hit), the controller sends the update-request to the EPD controller 210 directly, and when the corresponding preprocess cache does not exist (cache-miss), the controller sends an interruption to the SoC 200 and, if needed, makes the SoC 200 issue an update-request. Therefore, when the preprocess cache exists (cache-hit), it is possible to execute the update-process using a minimum configuration while the SoC 200 and the main memory 120 are kept powered-off, whereby it is possible to drastically reduce the power consumption. For example, in a case such as an electronic book application, for opening a new electronic book, the operation is executed with a configuration including the SoC 200 and the main memory 120, and for most of time during which simple page-turnings for browsing the electronic book are repeated, the operation is executed with the minimum configuration without the SoC 200 and the main memory 120.

Figure 11:
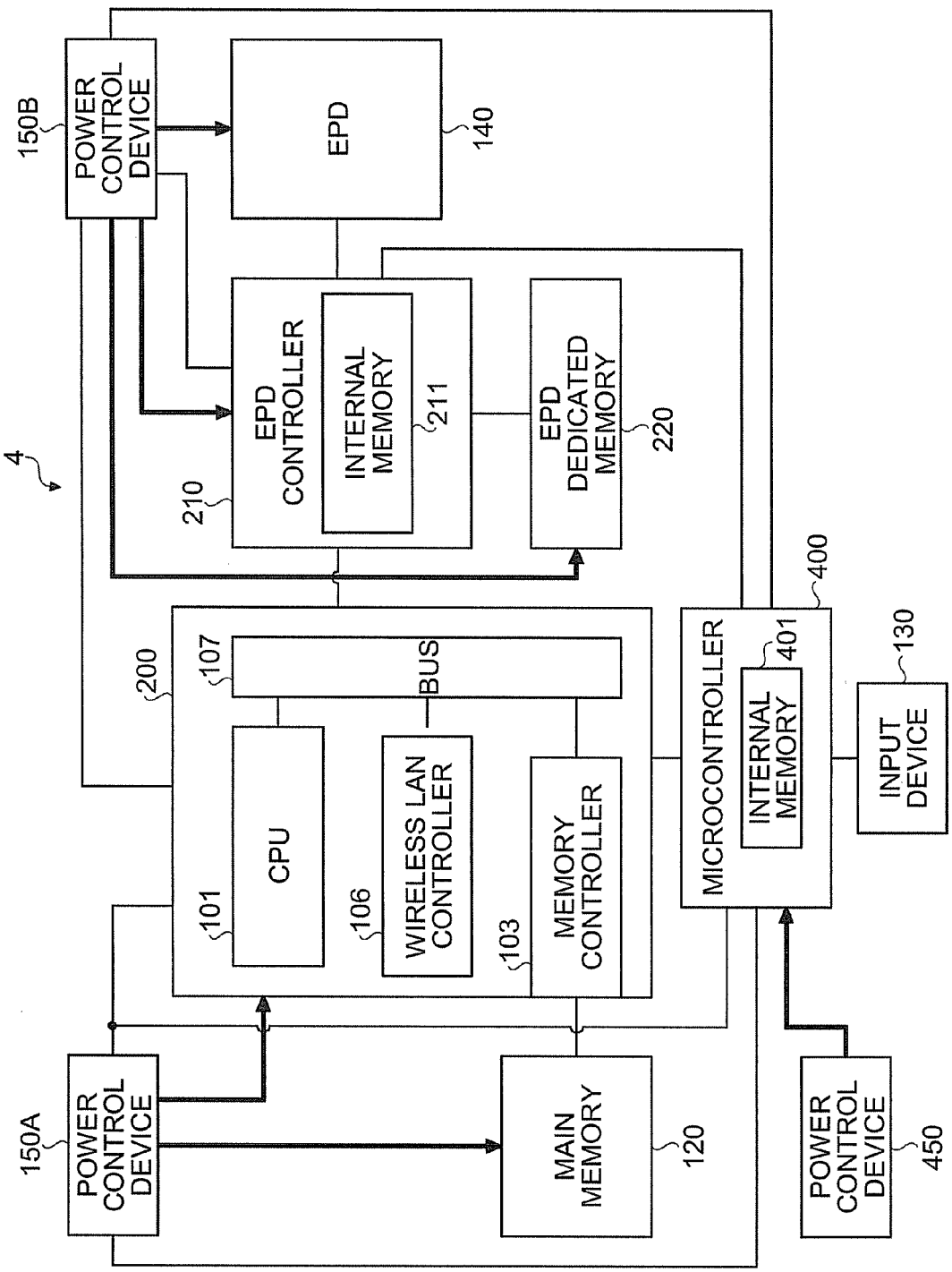
FIG. 11 is a block diagram showing an outline configuration of a data processing device according to a fourth embodiment.

FIG. 11 is a block diagram showing an outline structure of a data processing device according to the fourth embodiment. As shown in FIG. 11, the data processing device 4 has the SoC 200, the main memory 120, the EPD 140, the EPD dedicated memory 220, the power control devices 150A and 150B, a power control device 450, a microcontroller 400 and one or more input devices 130.

The input devices 130 include a keyboard, a touch panel, a network, or the like. Interruption handlings by these input devices 130 are transmitted to the microcontroller 400 arranged between the SoC 200 and the input devices 130, and will not be directly transmitted to the SoC 200.

Power consumption of the microcontroller 400 is lower than the SoC 200, and the microcontroller 400 is normally powered on. The microcontroller 400 has an internal memory 401, and a tag part of a preprocess cache is registered on the internal memory 401.

In the fourth embodiment, as the second embodiment, the EPD controller 210 executes the preprocess. The EPD controller 210 has the internal memory 211 such as a non-volatile MRAM, or the like. In the internal memory 211, also the preprocess cache constructed from a pair of the preprocessed update-data and the update-control-information selection ID is stored. The tag part of the preprocess cache is also stored on the internal memory 211 of the EPD controller 210. A consistency between the tag part of the preprocess stored on the internal memory 211 of the EPD controller 210 and the tag part of the preprocess stored on the internal memory 401 of the microcontroller 400 should be maintained. Also the update-control information is located on the internal memory 211 of the EPD controller 210.

A basic configuration of an EPD update controller is the same as the second embodiment. Also in the fourth embodiment, the EPD update controller 110 is the process in the EPD controller 210. However, a cache determining unit same as the cache determining unit 112 is also incorporated in the microcontroller 400. In addition, a power manager for powering on/off the SoC 200 can be incorporated in the microcontroller 400. A configuration of the preprocess cache stored on the internal memory 211 of the EPD controller 210 is the same as the preprocess cache exampled in the first embodiment (see FIG. 4).

Figure 12:
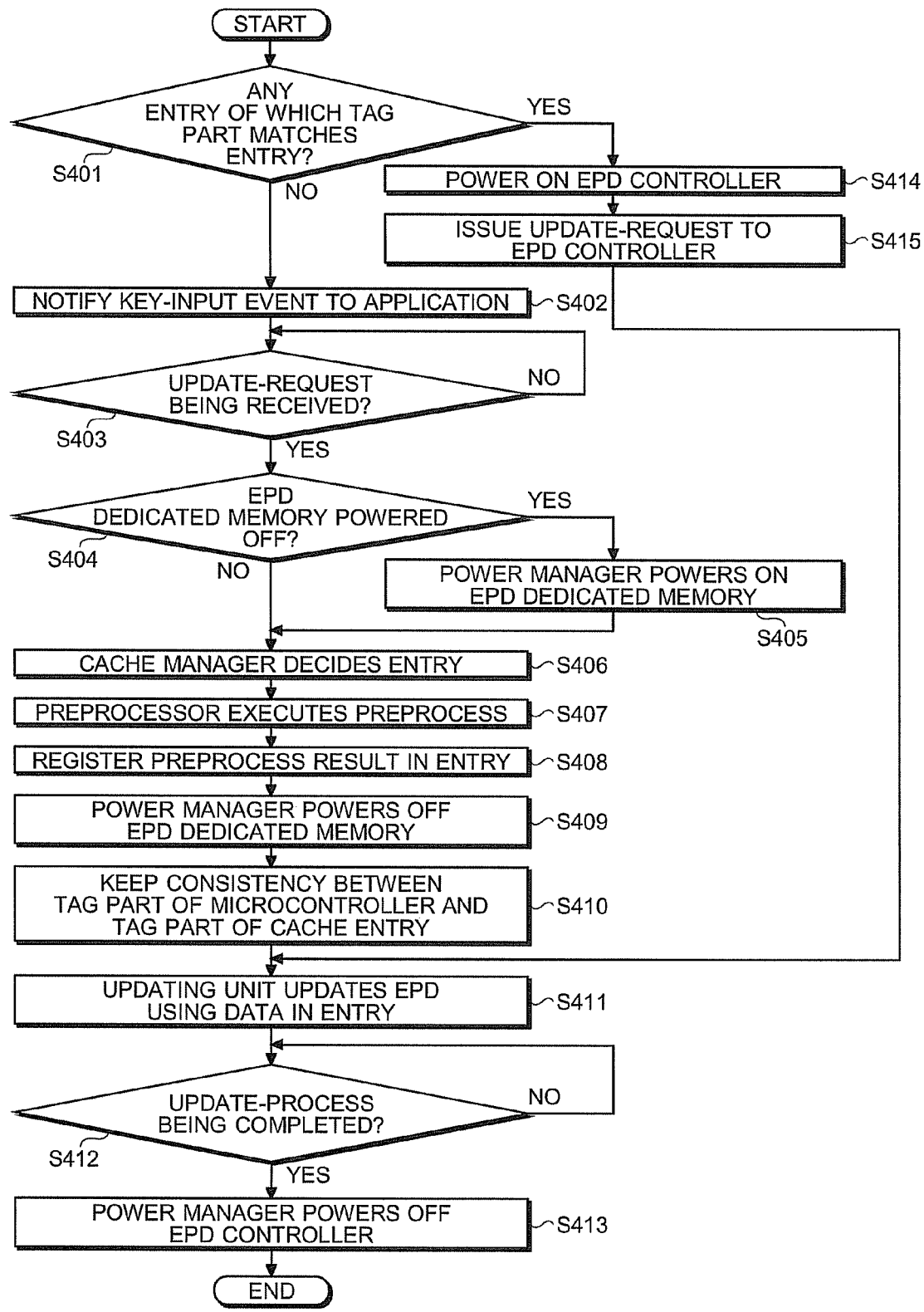
FIG. 12 is a flowchart showing an example of update-process according to the fourth embodiment.

FIG. 12 is a flow chart showing an example of an update-process according to the fourth embodiment. A process shown in FIG. 12 is started when an interruption to the microcontroller 400 occurs due to user of the data processing device 4 conducting a key-input on a keyboard, or the like. To a specific key of a keyboard, as the third embodiment, a pair of a specific update-data ID and a specific update-method tag, or the like, is previously assigned.

As shown in FIG. 12, in the update-process, the cache determining unit 112 on the microcontroller 400 checks whether a cache entry which matches a pair of an update-data ID and an update-method tag notified at the time of the interruption exists on the preprocess cache or not (cache determination) using a tag part of the preprocess cache on the internal memory 401 of the microcontroller 400 (step S401), and when the cache entry exists (step S401; YES), the microcontroller 400 instructs the power control device 150B to power the EPD controller 210 in order to power on the EPD controller 210 (step S414), transmits an update-request to the EPD controller 210 (step S415), and progresses to step S411. On the other hand, when the cache entry does not exist (step S401; NO), the cache determining unit 112 on the microcontroller 400 notifies an interruption to the SoC 200. Thereby, a process corresponding to a key-input event is notified to application software (step S402), and the process corresponding to the key-input event is executed by the application software. After that, as a result thereof, the update-request with the pair of the update-data ID and the update-method tag is issued to the EPD controller 210 as a result. Here, at the time of notification of the interruption to the SoC 200, when the SoC 200 is powered off, the power manager 115 of the microcontroller 400 powers on the SoC 200 using the power control device 150A, and then, notifies the interruption. Moreover, after the update-request is issued to the EPD controller 210 as a result of the process corresponding to the key-input event, it is possible to let the SoC 200 transit to a standby mode with low power consumption or to let the power manager 115 of the microcontroller 400 instruct to stop supplying power to the SoC 200.

Next, the power manager 115 being a process of the EPD controller 210 checks whether the EPD dedicated memory 220 is powered off for the purpose of aggressive power-saving or not (step S404), and when the EPD dedicated memory 220 is powered off (step S404; YES), the power manager 115 powers on the EPD dedicated memory 220 using the power control device 150B (step S405), and the EPD controller 210 progresses to step S406. Thereby, access to the EPD dedicated memory 220 is permitted. On the other hand, when the EPD dedicated memory 220 is powered on (step S404; NO), the EPD controller 210 directly progresses to the step S406.

Next, the cache manager 111 being a process of the EPD controller 210 decides the cache entry using an algorithm such as LRU for determining a cache entry to be replaced (step S406). Then, the preprocessor 113 being a process of the EPD controller 210 executes the preprocess while using the EPD dedicated memory 220 as a working memory (step S407), and registers a result of the preprocess on the decided cache entry (step S408).

Next, the power manager 115 being a process of the EPD controller 210 powers off the EPD dedicated memory 220 using the power control device 150B (step S409). Then, by transmitting information of the tag part of the preprocess from the cache manager 111 of the EPD controller 210 to the microcontroller 400 and executing a process of updating the tag part for getting synchronization on the microcontroller 400, the tag part stored on the internal memory 401 of the microcontroller 400 and the tag part stored on the internal memory 211 of the EPD controller 210 are made to synchronize with each other (step S410), and the EPD controller 210 progresses to step S411. Thereby, the consistency between the tag part stored on the internal memory 401 of the microcontroller 400 and the tag part stored on the internal memory 211 of the EPD controller 210 is maintained. Here, this step S410 can be executed via the SoC 200. Furthermore, when the update-process to be cached is limited to a number of certain pair of the preprocessed update-data ID and the update-method tag and is previously set to the data processing device 4, it is possible to omit the process of step S410.

In step S411, the updating unit 114 being a process of the EPD controller 210 reads out the update-control information corresponding to the update-control-information selection ID registered on the preprocess cache, reads out the preprocessed update-data registered on the preprocess cache, and executes a drawing process to the EPD 140 (step S411). After that, the EPD controller 210 waits for completion of the update-process (step S412; NO). When the completion of the update-process is notified by an interruption handling, or the like (step S412; YES), the power manager 115 on the microcontroller 400 powers off the EPD controller 210 using the power control device 150B (step S413). This process can be executed by the power manager of the EPD controller 210. Thereby, the power consumption of the EPD controller 210 can also be reduced. Because the internal memory 211 is a non-volatile memory, even if the EPD controller 210 is powered off, data cached on the internal memory 211 is maintained. After that, the EPD controller 210 finishes this operation.

Fifth Embodiment

As for conducting the above-described embodiments more effectively, there is a method of executing a preload with respect to the preprocess cache. The preload is a process in that a preprocess for update-data of an update-process likely to be executed in the future is executed beforehand and a result of the preprocess is registered on the preprocess cache. In this way, if an update-process likely to be executed in the future can be specified, by executing a preload in which a preprocess for a target update-data is executed beforehand and a result of the preprocess is registered on the preprocess cache before an actual update-request is issued, it is possible to use data on the preprocess cache in response to even the initial update-request. As a result, because it is possible to shorten the update time, it is possible to improve the responsiveness of the data processing device. Furthermore, by shortening the update time, it is possible to prolong a period for powering off the SoC 200, the memories, and so on, whereby it is possible to achieve further power saving.

The preload of preprocess can be applied to any one of the first to fourth embodiments. In the following explanation, the third embodiment in which the internal memory 104 of the SoC 200 is used for a cache is used as a basic configuration.

The preload of preprocess can be applied to various uses such as updating the next selection item or the next page in the menu, the list, the electronic book, or the like, for instance. Here, as an example, a kana-kanji conversion application is explained.

Figure 13:
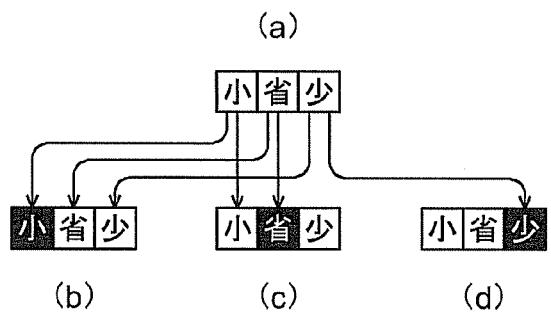
FIG. 13 is an illustration for explaining an outline of pre-load according to a fifth embodiment.

FIG. 13 is an illustration for explaining an outline of a preload in a kana-kanji conversion application. In the kana-kanji conversion application, when a reading of a target word (e.g. "shou") is inputted by user and a conversion key is inputted, for instance, a plurality of candidates of kanji-characters (e.g. "小", "省", "少") specified from a reading and a kanji-character table called a dictionary are displayed. After that, by the user processing the conversion key, a focus shifts to the next candidates in order. Firstly, it is assumed that the original colored data as shown in (a) of FIG. 13 exists, for instance. When the user inputs the conversion key once, as shown in (b) of FIG. 13, three kanji-character candidates "小", "省", and "少" are displayed in black and white on the EPD 140. Specifically, in an order from a left side, the focused candidate "小" is highlighted (i.e. a background is black and a character is white), and the unfocused candidates "省" and "少" are not highlighted. Next, when the user inputs the conversion key once, as shown in (c) of FIG. 13, the focus shifts to the candidate "省" and the other candidates "小" and "少" are not highlighted. Furthermore, when the conversion key is inputted once more, as shown in (d) of FIG. 13, the focus shifts to the candidate "少" and the other candidates "小" and "省" are not highlighted.

In order to display the state shown in (b) of FIG. 13, three preprocesses including a preprocess <'小', 'W'> for the candidate "小" for highlighting and preprocesses <'省', 'B'> and <'少', 'B'> for the candidates "省" and "少" for not highlighting are executed. In order to display the state shown in (c) of FIG. 13 from the state shown in (b) of FIG. 13, additionally, two preprocesses including a preprocess <'小', 'B'> of the candidate "小" for not highlighting and a process <'省', 'W'> of the candidate "省" for highlighting are executed. In order to display the state shown in (d) of FIG. 13 from the state shown in (c) of FIG. 13, although there is a necessity to update the candidates "省" and "少", because the preprocess cache of <'省', 'B'> for the candidate "省" can be reused, only a preprocess <'少', 'W'> of the candidate "少" for highlighting is executed.

Because the user may expect that the focus shifts for every pressing of the conversion key, when executing the preprocess for every pressing takes time for the focus to be shifted the focus, there is a possibility of undermining the usability. Furthermore, because the main memory 120 storing the original data needs to be accessed every time, there may be problems in that the main memory 120 may need to be switched on and off repeatedly, powering off of the main memory 120 may become difficult, and so on. This may lead to difficulties in utilizing the advantage of a non-volatile memory.

Therefore, by previously executing six preprocesses <'小', 'W'>, <'省', 'W'>, <'少', 'W'>, <'小', 'B'>, <'省', 'B'>, and <'少', 'B'> to be used for a series of processes in a lump and by registering the results on the preprocess cache located on the internal memory 104 of the SoC 200, it is possible to speed up the shift of the focus. Furthermore, because a single power-on of the main memory 120 is required, it is also possible to reduce the power consumption. When a processing time for executing the six preprocesses in a lump affects the usability, it is possible to conceal a part or all of the processing time of the preprocesses in the drawing process by taking advantage of a property that a processing time of a single drawing process for the EPD 140 is comparatively long.

Figure 14:
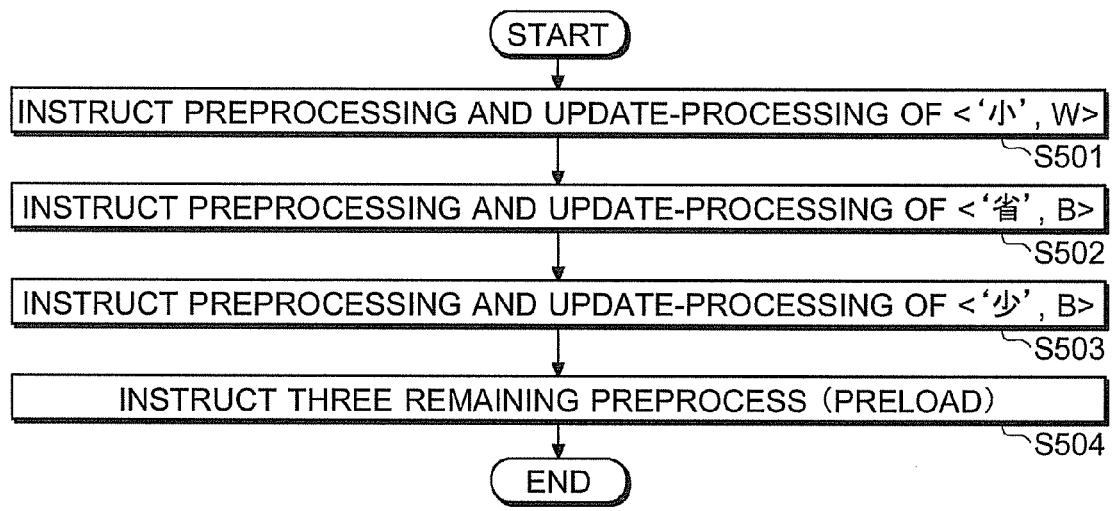
FIG. 14 is a flowchart showing an example of a process flow according to the fifth embodiment.

FIG. 14 is a flow chart showing an example of a process flow of application software for preloading to a preprocess cache in the kana-kanji conversion application. In the method shown in FIG. 14, the six preprocesses mentioned above are not executed in a lump. Firstly, when the conversion key in a keyboard, or the like, is inputted by a user, three update-requests for <'小', 'W'>, <'省', 'B'> and <'少', 'B'> minimum required for display the state shown in (b) of FIG. 13 are issued to the EPD update controller 110 (step S501 to S503). In response to this, the EPD controller 210 executes three preprocesses and three drawing processes for the three update-requests in parallel. At this time, the EPD update controller 110 executes a process of caching to the preprocess cache of the internal memory 104 of the SoC 200. During the drawing process for the EPD 140 is executed, in the kana-kanji conversion application, the EPD update controller 110 is instructed to execute remained thee preprocesses required to display the state shown in (c) of FIG. 13 and the state shown in (d) of FIG. 13 (step S504). Thereby, all of results of the six preprocesses are registered on the preprocess cache. Here, in step S504, a drawing process based on the results of the three preprocesses is not executed. After which, when the conversion key is inputted by the user again, update-processes required for displaying the state shown in (c) of FIG. 13 and the state shown in (d) of FIG. 13 are executed while using data on the preprocess cache. At this time, because access to the main memory 120 and preprocess are not occurred, it is possible to suppress the power consumption and fast shift the focus.

Figure 15:
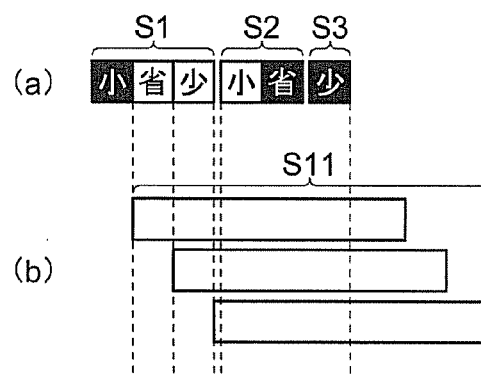
FIG. 15 is a timing chart of preprocess and drawing process according to the fifth embodiment.

FIG. 15 shows an example of a timing chart of the preprocess and the drawing process when the process flow shown in FIG. 14 is executed. (a) of FIG. 15 shows a timing chart of the six preprocess of <'小', 'B'>, <'省', 'W'>, <'少', 'W'>, <'小', 'W'>, <'省', 'B'>, and <'少', 'B'>, and (b) of FIG. 15 a timing chart of the three drawing processes of <'小', 'B'>, <'省', 'W'>, <'少', 'W'> for displaying the state shown in (b) of FIG. 13.

As is evident from FIG. 15, after the three preprocess (S1) for displaying the state shown in (b) of FIG. 13 are executed, behind parallel executions of the three drawing processes (S11) using the results of these preprocess (S1), the preprocesses (S2 and S3) being necessary for displaying the state shown in (c) of FIG. 13 and the state shown in (d) of FIG. 13 are executed. As a result, because the preprocessing time of the preprocesses (S2 and S3) of <'小', 'W'>, <'省', 'B'> and <'少', 'B'> are concealed in the drawing processes (S11), it is possible to execute the preprocesses (S2 and S3) for preload without affecting the time for displaying the state shown in (b) of FIG. 13.

However, when the preloaded data is not used, the power consumed for the preprocess for the preload becomes waste. In such case, it is preferred that the history information about use of candidates in the kana-kanji conversion application is stored while timing and a size of preload are decided based on the history information. Furthermore, considering the time for the drawing process and the time for the preload of the preprocess, it is possible to calculate how many preloads for candidates can be concealed in the drawing time.

Moreover, it is possible to control aggressiveness of preload depending on surplus power generated by the solar cell or the remaining battery power of the accumulator of the data processing device. For instance, it is possible to structure such that when surplus power generated by the solar cell or the remaining battery power of the accumulator is plenty, aggressively execute as many preloads as possible to increases the responsiveness of the data processing device, or when the surplus power generated by the solar cell and the remaining battery power of the accumulator is small, suppress the number of preloads.

Sixth Embodiment

The EPD update controller 110 using the preprocess cache in the first to fourth embodiments can be combined with the preload of the preprocess cache in the fifth embodiment. In such case, by saving a state of the SoC 200 to a non-volatile memory, it is possible to speed up a restore process from a standby mode with low power consumption at a time when hibernation for powering off the SoC 200, the memories and the display is executed.

Figure 16:
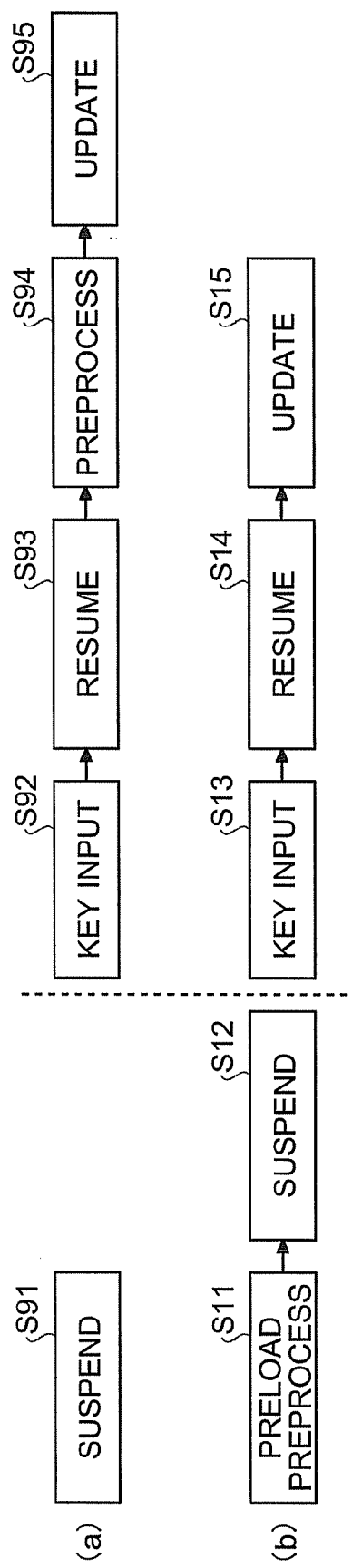
FIG. 16 is a timing chart showing an operation example at a time of hibernation according to a sixth embodiment.

FIG. 16 is a timing chart showing an example of operation in hibernation when the preprocess cache is not executed and when the preprocess cache is executed. (a) of FIG. 16 shows a timing chart of a case where the preprocess cache is not executed on a data processing device which uses an EPD as a display, and (b) of FIG. 16 shows a timing chart of a case where the preprocess cache is executed on the data processing device.

In a data processing device which uses a LCD (liquid crystal display) as a display, at a standby mode in which a suspend process of the hibernation is executed, the LCD is powered off, and nothing is shown on the display. Therefore, the restore process from the standby mode for user starts by inputting a specific key of a keyboard, turning on a power button, or the like, and finishes by displaying a screen directly before executing the suspend mode (in (a) of FIG. 16, S92 to S93). The usability for user can be presumed as a time until the screen directly before executing the suspend mode.

On the other hand, a case of a data processing device with the EPD 140 as a display is different. Also at the suspended standby mode, on the EPD 140 being a non-volatile display, a view of the screen directly before executing the suspend mode is kept. Therefore, in the data processing device having the EPD 140 as a display, the restore process starts by an input on the currently displayed screen at the standby mode through a touch panel or a keyboard, but not by an input through a specific key, or the like. Furthermore, a response time for the user becomes a period starting from the time the process on the displayed screen during the standby mode is executed till the time a result of the process is displayed on the EPD 140 (S92 to S95) (i.e. a period until the screen of the EPD 140 is changed). Accordingly, in the data processing device having the EPD 140 as a display, in order to improve the responsiveness, it is necessary to shorten the period starting from the time the process on the displayed screen during the standby mode is executed till the time the result of the process is displayed on the EPD 140.

Influences of a period starting from the time the user finishes operation of the data processing device till the time the suspend process is started on the responsiveness for user is small. Therefore, it is possible to execute the preprocess of the update-process expected to be executed after the resuming and preloading a result thereof to the preprocess cache, before starting the suspend process as shown in S11. In such case, because it is possible to use the preprocess cache at the time of resuming, it is possible to improve the responsiveness. However, when the user faces many update-processes to come to complication of the restore process, preloads for all of the update-processes may raise costs. Therefore, for instance, it is possible to determine whether the preload should be executed or not based on the number of the branches. It is also possible to structure such that a specific image data for showing that the data processing device is in a restore process is defined, a preprocess result of that image data is always registered on the preprocess cache, and when the restore process starts, the user is instantaneously informed about the start of the restore process through a display on a specific region of the EPD 140.

Figure 17:
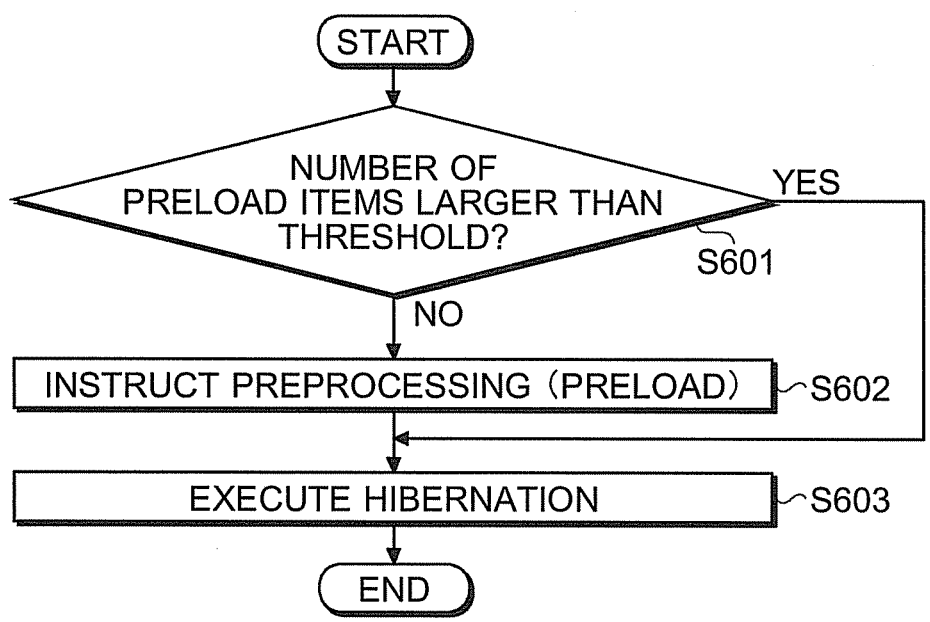
FIG. 17 is a flowchart of a process flow at the time of the hibernation according to the sixth embodiment.

FIG. 17 is a flow chart showing an example of a process flow in hibernation executed on an electronic book terminal, an interactive electronic POP or electronic chart, or the like. In the example shown in FIG. 17, it is assumed that the power consumption is reduced by aggressively using hibernation on the application during browsing. Furthermore, it is also assumed that the restore process is started by triggering an input of the BACK key or the NEXT key of a keyboard during a suspended standby mode. When the BACK key is inputted, update of a preceding page with respect to a current page is executed, and when the NEXT key is inputted, update of a next page is executed.

As shown in FIG. 17, in the process flow in hibernation, firstly, an OS of the data processing device confirms whether the number of the branches of the update-process (preload items) corresponding to complication of the restore process is more than a threshold or not before instructing to execute hibernation on the application software (step S601). For example, in a case where the threshold is 1, although there are two selection items of the NEXT key and the BACK key, because the BACK key hits the preprocess cache, it is possible to determine that a selection item is single by presuming the preload being unnecessary.

When the number of the preload items is larger than the threshold (step S601; YES), the OS progresses to step S603. On the other hand, when the number of the preload items is smaller than the threshold (step S601; NO), the OS instructs the EPD update controller 110 to execute the preprocess of the next page to be updated at a time when the NEXT key is inputted (step S602), and progresses to step S603. Thereby, the next page is preloaded to the preprocess cache.

In step S603, after completion of the preload, the OS executes the hibernation (step S603). After that, when the restore process for resuming from the standby mode is started by using the input of the NEXT key as a trigger, an update-request of the next page is issued to the EPD update controller 110. In response to this, due to the preprocess cache cache-hits, the EPD update controller 110 executes the update-process using the preprocess cache. Thereby, it is possible to speedily resume from the suspend standby mode.

Here, the threshold for the preload items can be varied depending on surplus power generated by the solar cell and/or battery power of the accumulator of the data processing device. For example, when surplus power generated by the solar cell or battery power of the accumulator is much, it is possible to increase the threshold.

In the explanation, although the example of the restore process from the standby mode in the case where the hibernation is executed, it is also possible to apply the embodiment to the standby mode with low power consumption incorporated in the data processing device.

Seventh Embodiment

In the preprocess cache method in the first to fourth embodiments, by giving information and idea about update-process, etc., stored in the application software as hint information, it is possible to increase a cache-hit ratio of the preprocess cache. Furthermore, by ensuring a condition in which the cache-hit to the preprocess cache certainly occurs, it is possible to omit a data creating process such as rendering for preparing update-data on a frame buffer, or the like, and a process of writing the created update-data in the frame buffer, and thereby, it is possible to achieve more aggressive power-saving and speeding-up of processes.

As update-processes of the EPD 140, there are one in which probability of executing the same update-process (hereinafter referred to as high repetition probability) is high and another one in which probability of the same update-process is low (hereinafter referred to as low repetition probability). When application software, middleware, or the like, can specify the update-process with high repetition probability, by adding hint information indicating that the update-process has the high repetition probability to the update-request to be transmitted to the EPD update controller 110, it is possible to use the hint information for determining whether the cache manager 111 of the EPD update controller 110 should cache a preprocess result or not. As a result, the cache-hit ratio can be increased, and it is possible to reduce average power consumption and processing time being necessary for update-process. Furthermore, as the third embodiment, when memories capable of having the cache located and having different access speeds are arranged in the data processing device, it is also possible to use the hint information for determining which preprocess result in the update-process is to be located on a high-speed memory. The hint information, for instance, may indicate that the preprocess result of a certain update-process should not be cached, the preprocess result of a certain update-process should be cached as much as possible, the preprocess result of a certain update-process of which repetition probability is high in a case of data such as a menu, for instance, has to be cached and locked in order to prevent the preprocess result from being removed, and so on.

In FIGS. 18 and 19, an outline of an example in which, by adding the hint information for instructing that the preprocess result should be cached for sure on the preprocess cache and locked in order to ensure the condition in which the cache-hit to the preprocess cache certainly occurs, it is possible to omit the data creating process such as rendering for preparing update-data on a frame buffer, or the like, and the process of writing the created update-data in the frame buffer, will be shown.

Furthermore, in FIG. 20, an example of a cache entry of the preprocess cache is shown. The example shown in FIG. 20 has a configuration in that a LOCK bit is added to the preprocess cache shown in FIG. 4. As shown in FIG. 20, when the hint information for instructing that the preprocess result is certainly cached and locked is added, the cache manager 111 assigns '1' to the LOCK bit of the preprocess cache. When the LOCK bit is '1', the preprocess cache can not be replaced with another data. However, in a case where the LOCK bits of all of the cache entries are '1' and it is impossible to add a new cache entry, it is possible to structure such that when the cache manager 111 receives next hint information, the update-process is executed without caching and an unnecessary LOCK bit is unlocked by notifying application software, or the like, that it is impossible to add a new cache entry.

The example shown in FIG. 18 is an example a case where update-process is executed while the hint information for instructing that the preprocess result is cached for sure and locked is added, at the time of initial updating, or the like. As shown in FIG. 18, firstly, by executing a rendering process for creating update-data, or the like, by using the CPU 101, an accelerator such as a GPU, or the like, update-data 731 is created from data 701 being origin of the update-data. The created update-data 731 is copied on a memory, which may be a frame buffer 703, or the like, in a GPU, or the like, accessed by the preprocess accelerator 102. The preprocessor 113 instructs the preprocess accelerator 102 to execute the preprocess. The preprocess accelerator 102 executes the preprocess in response to the instruction. At that time, when the cache determining unit 112 determines cache-miss, the preprocess cache of which LOCK bit is assigned to '1' is cached by the cache manager 111, and the updating unit 114 instructs the EPD controller 105 to execute the update-process using the data on the preprocess cache. Here, it is also possible to add the hint information at a time when the EPD update controller 110 is instructed to execute preload of the preprocess cache before executing the drawing process.

The example shown in FIG. 19 is an example of a case where a follow-on update-process is executed in a state where a condition in which the cache-hit to the preprocess cache certainly occurs is ensured. In the example shown in FIG. 19, because all information necessary for update-process is located on the preprocess cache, there is no need to locate update-data on the frame buffer. Accordingly, it is possible to omit the process for creating the update-data 731, a process for writing the update-data in the frame buffer 703, or the like. Therefore, it is possible to drastically shorten processing time of series processes until the updating unit 114 instructs the update including the creation of the update-data 731. As a result, it is possible to drastically improve the responsiveness of the data processing device, and because it is possible to prolong the period during which the data processing device is at the standby mode with low power consumption, it is possible to reduce the power consumption for as much as for the prolonged period. Furthermore, because it is also possible to reduce power necessary for the process of creating the update-data 731, the process of writing in the frame buffer 703, and the preprocess, it is possible to drastically reduce the power consumption.

Figure 21:
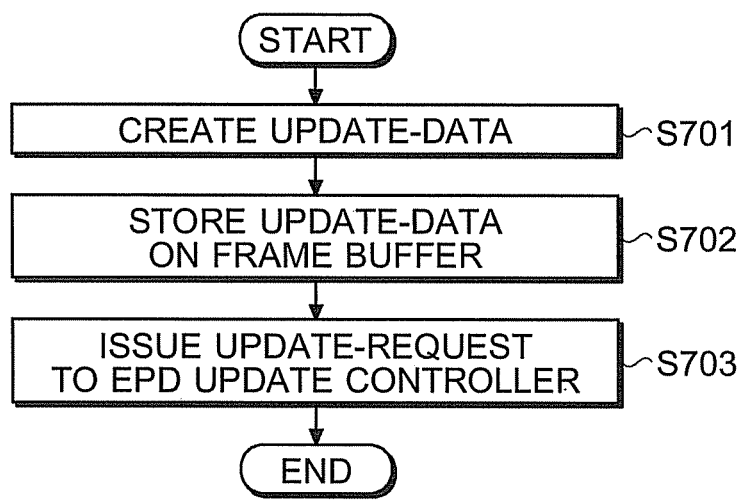
FIG. 21 is a flowchart showing an example of a process flow according to the seventh embodiment.

FIG. 21 is a flow chart showing an example of a process flow in application software or middleware according to the seventh embodiment. In FIG. 21 a case where update-process is executed while the hint information for instructing that the preprocess result is certainly cached and locked is added in a case of an initial update, or the like, is explained as an example. Firstly, an accelerator such as the CPU 101, a GPU, or the like, executes a rendering process for creating update-data 731, and so forth (step S701). Next, the accelerator such as the CPU 101, the GPU, or the like, copies the created update-data 731 to a memory being the frame buffer 703, or the like, accessed by the preprocess accelerator 102 (step S702). After that, the accelerator issues an update-request including the hint information to the EPD update controller 110 being a driver of the EPD controller 210, or the like (step S703), and finishes this operation.

Figure 22:
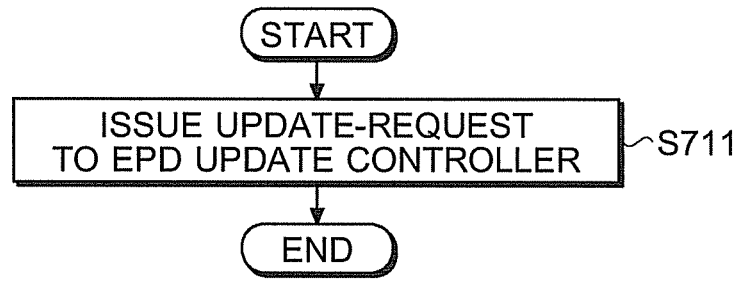
FIG. 22 is a flowchart showing an example of update-process according to the seventh embodiment.

FIG. 22 is a flow chart showing an example of a case where a follow-on update-process is executed in a state where a condition in which the cache-hit to the preprocess cache certainly occurs is ensured. In the case of FIG. 22, because all information necessary for update-process is located on the preprocess cache, application software or middleware executes a process for issuing an update-request to the EPD update controller 110. As this, in the application software or the middleware, it is not necessity to execute a process for writing in the frame buffer 703.

A reusable process result among process results for creating the update-data 731 can has a structure for realizing two-level cache to be cached in application software or middleware.

Furthermore, the seventh embodiment can be combined with the preload to the preprocess cache in the fifth embodiment. For instance, when it is previously decided that all pages are to be updated in order in application for conducting an examination, a questionnaire, or the like, for education, or the like, by adding hint information for preloading a N+1-th page to the preprocess cache at a time when a N-th page is updated, it is possible to have an update-process of the N-th page and a preprocess of the N+1-th page overlapped. As a result, shorter processing time can be concealed.

Other than the method of adding the hint information to the update-request each time the update-request is made, it is possible to structure such that information and idea stored in application software is transmitted to the EPD update controller 110 as hint information just before booting application software or starting a series of previously-decided processes, for instance. Thereby, in browsing with comparatively a lot of page-turnings such as browsing of an academic article, an electronic chart, or the like, with comparatively a small number of pages, by notifying a browsing method and the number of the entire pages as hint information, it is possible to determine whether caching of the entire pages is more efficient or not, or the like.

Eighth Embodiment

By reducing the preprocessing time by using the preprocess cache according to the first to fourth embodiment, it is possible to put forward a beginning of a follow-on update-process. As a result, because it is possible to shorten a total processing time of the update-processes, it is possible to turn the SoC 100 and the memories to the standby mode with low power consumption or power-off, and as a result, it is possible to further reduce the power consumption.

In the following, for the purpose of clarification, although the structure of the data processing device 1 (see FIG. 1) according to the first embodiment will be used as a premise, the eighth embodiment can be applied to any one of the first to fourth embodiments. Here, as a premise, the EPD controller 210 has an algorithm which enables starting of update-processes periodically. In such configuration, for instance, timing at which starting of an update-process becomes possible arrives for every N millisecond, and to an executable update-request for which a preprocess is finished by that time, an actual drawing process on the EPD 140 is executed.

Figure 23:
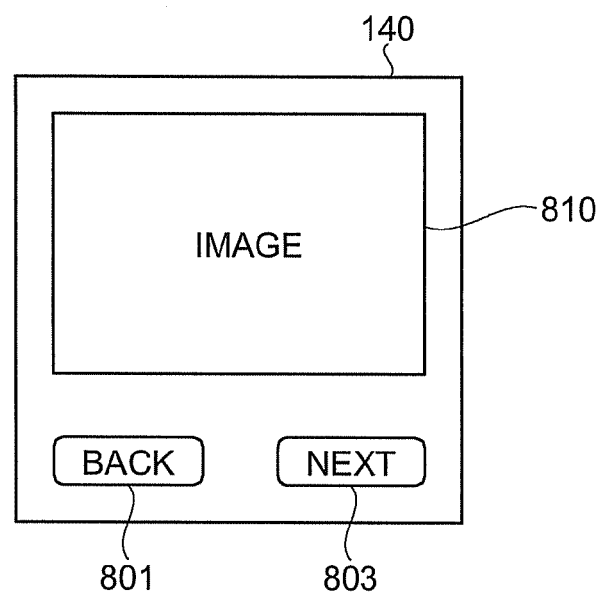
FIG. 23 is an illustration showing an image viewer application according to an eighth embodiment.

With referring FIG. 23, an image viewer application for this description will be explained. As shown in FIG. 23, in the image viewer application, a region 810 for displaying image data, a BACK key 801 and a NEXT key 803 for switching image data are displayed on the EPD 140 by software. When the BACK key 801 is selected by a touch panel, a previous image data is displayed on the region 810, and when the NEXT key 803 is selected, a next image data is displayed on the region 810. In the image viewer application, when the BACK key 801 and the NEXT key 803 are selected, in order to feedback the select to user, an update-process of the selected key is executed. Because these keys are frequently updated in the image viewer application, there is a high possibility of cache-hit on the preprocess cache. On the other hand, because the image data are switched one after another, when the NEXT key 803 is selected, update of un-cached image data occurs. That is, in the application, when the NEXT key 803 is selected, two update-processes including an update-process of the NEXT key 803 cache-hitting on the preprocess cache and an update-process of image data not cache-hitting on the preprocess cache are executed.

Figure 24:
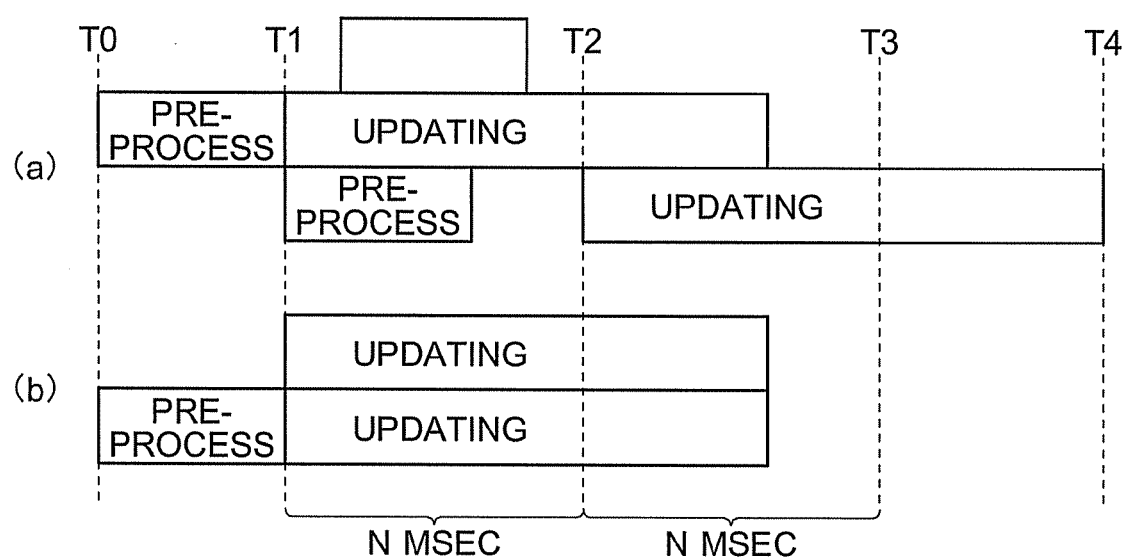
FIG. 24 is a timing chart showing two update-processes according to the eighth embodiment.

FIG. 24 is a timing chart showing examples of two update-processes executed in parallel on the EPD controller. (a) of FIG. 24 is a timing chart of a case where there is not the preprocess cache of the two update-processes executed in parallel on the EPD controller 105. Firstly, a preprocess of the NEXT key 803 is started at a timing T0, and because a drawing process of the NEXT key 803 can be finished by the timing T1 at which starting of update becomes possible, the drawing process of the NEXT key 803 is started at the timing T1. In the configuration of FIG. 1, because the preprocess accelerator 102 for executing a preprocess is single, the preprocess of the image date starts from the timing T1 at which the preprocess of the NEXT key 803 is finished. Because this preprocess is finished slightly before a timing T2 at which starting of update becomes possible, waiting time for starting the update until the timing T2 occurs. When the timing T2 is arrived, a drawing process of the image data is started. At a timing T4, because the drawing process is finished, it becomes possible to power off the main memory 120 and the SoC 100 or transit them to the standby mode with low power consumption.

On the other hand, (b) of FIG. 24 is a timing chart of a case where the preprocess cache is used. Firstly, because the NEXT key 803 cache-hits on the preprocess cache, a preprocess of the NEXT key can be omitted. Therefore, the preprocess accelerator 102 can immediately execute the preprocess of the image data. Because the drawing process of the NEXT key 803 is not started until the timing T1 at which starting of update becomes possible, waiting time for starting the update occurs. Because the preprocess of the image data is finished by the timing T1, the drawing processes of the image data and the NEXT key 803 are started at the same time and executed in parallel, and the drawing processes are finished before the timing T4. Therefore, during a period from the finish time to the timing T4, it is possible to power off the main memory 120 and the SoC 100 or transit them to the standby mode with low power consumption. As a result, as compared with the case where the preprocess cache is not used, it is possible to further reduce the power consumption.

As described above, by using the preprocess cache, it is possible to reduce the power consumption even if an update-process which is not capable of using the preprocess cache is included in the series of update-processes.

Ninth Embodiment

In the above-described embodiments, the update-data ID for identifying the update-data is stored in the tag part of the preprocess cache. However, the structure is not limited to such structure while it is also possible to use a structure where the update-data ID is not used, for instance. In such case, instead of the update-data ID in the structure of the preprocess cache shown in FIG. 4, the update-data itself can be used. Additionally, a field of the update-data ID may be a pointer to the update-data. By applying such configuration, even if an update-request without the update-data ID is issued, by comparing the update-data and the update-data registered on the preprocess cache, it is possible to conduct a determination similar to the determination on whether the update-data ID is matched or not in the above-described embodiments. In such case, a comparison between the update-data is conducted. Therefore, because the smaller the data size of the update-data becomes the smaller the throughput will be, it is also possible to execute caching and determining. Furthermore, a size of the update-data and a display position on the EPD 140 can be used instead of the update-data ID.

Such configuration can be applied to all of the above-described embodiments. Here, a comparison between the update-data and the update-data registered on the preprocess cache can be executed by software or hardware.

Tenth Embodiment

Although the above-described embodiments have the configuration in that the single data processing device reduces the power consumption by using the preprocess cache, it is also possible to structure such that when a plurality of data processing devices execute a common preprocess, by off-loading the common preprocess to a cloud, a server, a multifunction machine, a smartphone, a tablet PC, a digital television, and so on, each data processing device will not execute the common preprocess.

Figure 25:
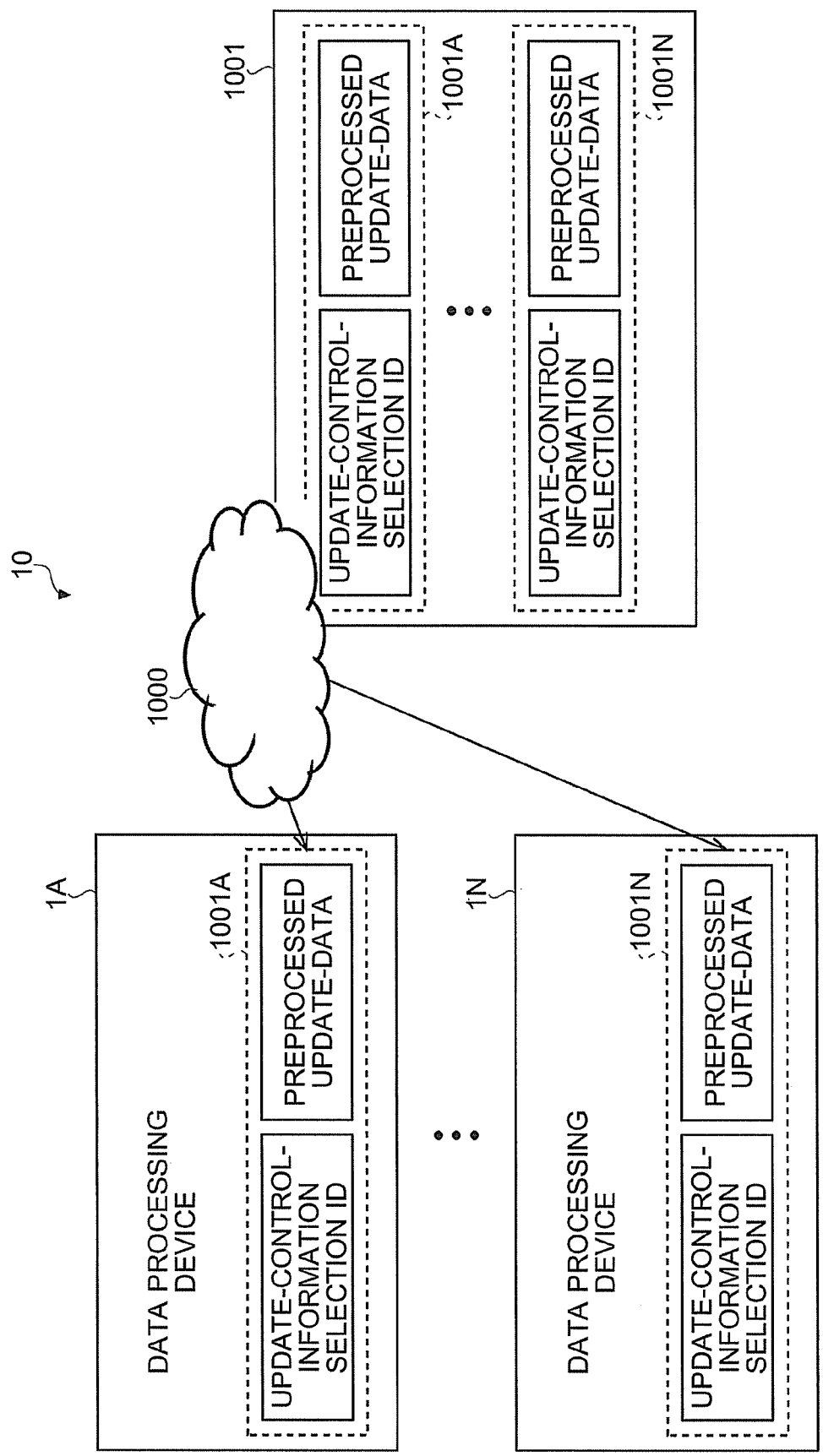
FIG. 25 is a block diagram showing an outline structure of a cloud system according to a tenth embodiment.

FIG. 25 is a block diagram showing an outline configuration of a cloud system according to the tenth embodiment. As shown in FIG. 25, the cloud system 10 has a configuration in that a plurality of data processing devices 1A to 1N and a cloud server 1001 are connected to each other via a network 1000 being an internet, or the like. Each of the data processing devices 1A to 1N can be any one of the data processing devices of the above-described embodiments. In the following, for the sake of shorthand, each data processing device 1A to 1N is the data processing device 1 according to the first embodiment. The cloud server 1001 is a computer system capable of communicating by using the wireless LAN controller 106 in the SoC 100, or the like, and stores a preprocess result obtained by executing the preprocess for the update-data as preprocess caches 1001A to 1001N. The cloud server 1001 may be a server, a cloud, a multifunction machine, a smartphonr, a tablet PC, a digital television, or the like, for instance. The preprocess caches 1001A to 1001N is managed on a non-volatile memory on a computer constructing a cloud.

An EPD update controller arranged at a side of the cloud server 1001 can be the same as the EPD update controller 110 (see FIG. 2) according to the first embodiment. However, the updating unit 114 is located at a side of each data processing device 1A to 1N. When the same electronic book is browsed on each of the data processing devices 1A to 1N, for instance, executing the same preprocess on every data processing device may be a waste of power. Therefore, in the tenth embodiment, the common preprocess is executed on the cloud server 1001 for preprocessing, and a pair of the preprocessed update-data being a result of the common preprocess and the update-control-information selection ID is cached on the cloud server 1001 as the preprocess caches 1001A to 1001N.

Figure 26:
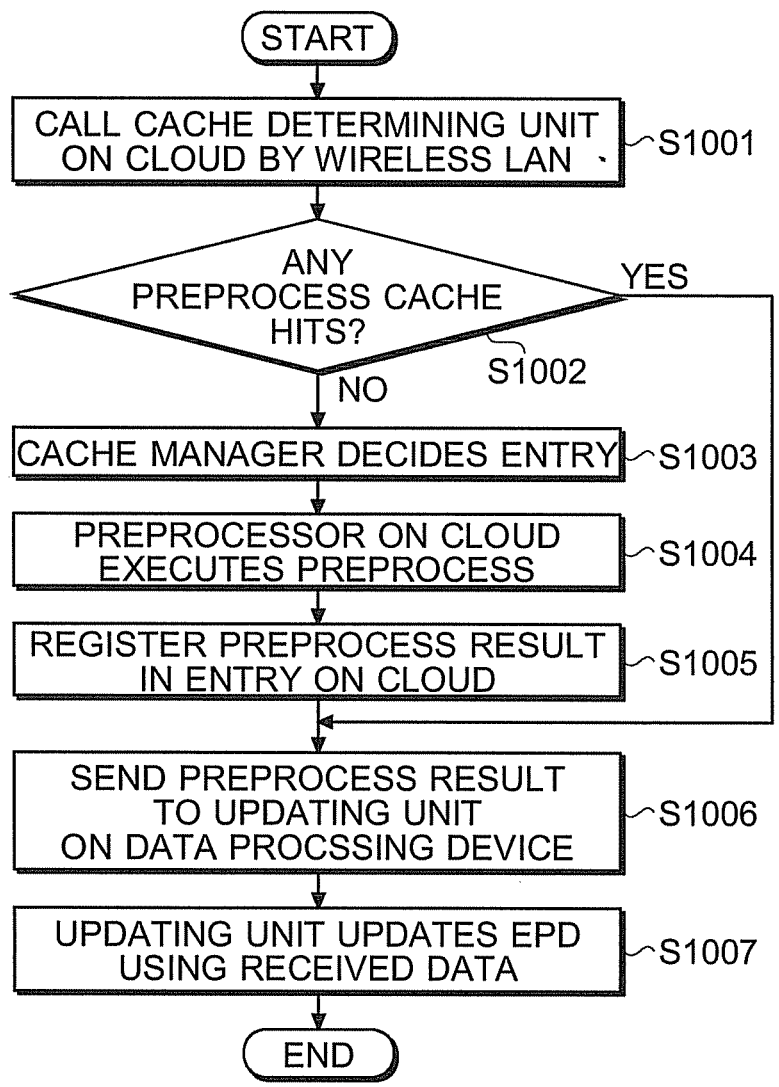
FIG. 26 is a flowchart of a process flow of the cloud system according to the tenth embodiment.

FIG. 26 shows an example of a process flow of the cloud system according to the tenth embodiment. As shown in FIG. 26, firstly, when any page of a specific electronic book is displayed on each of the data processing device 1A to 1N, an update-request of a correspond update-data is transmitted from each of the data processing devices 1A to 1N to the EPD update controller 110 on the cloud server 1001 via the wireless LAN controller 106 of each of the data processing devices 1A to 1N, and the cache determining unit 112 in the EPD update controller 110 of the cloud server 1001 is called (step S1001). The cache determining unit 112 checks the preprocess caches 1001A to 1001N on the cloud server 1001, and determines whether a result of the common preprocess hits the preprocess caches 1001A to 1001N (cache determination) or not (step S1002). When the result hits any one of the preprocess caches 1001A to 1001N (step S1002; YES), the EPD update controller 110 of the cloud server 1001 progresses to step S1006. On the other hand, when the result does not hit the preprocess caches 1001A to 1001N (step S1002; NO), the cache manager 111 in the EPD update controller 110 of the cloud server 1001 decides a cache entry for registering the preprocess result (step S1003). Next, the preprocessor 113 in the EPD update controller 110 of the cloud server 1001 executes the preprocess of the correspond page on the cloud server 1001 (step S1004), and registers the update-control-information selection ID and the preprocessed update-data being preprocess results on the decided preprocess cache (step S1005), and the EPD update controller 110 progresses to step S1006.

In step S1006, the cloud server 1001 sends a pair of the update-control-information selection ID, the preprocessed update-data, and so on, on the preprocess cache to the updating unit 114 in each of the data processing devices 1A to 1N (step S1006). In response to this, the updating unit 114 in each of the data processing devices 1A to 1N reads out update-control information corresponding to the received update-control-information selection ID from the main memory 120 of each of the data processing devices 1A to 1N, and instructs the EPD controller 105 of each of the data processing devices 1A to 1N to execute the drawing process to the EPD 140 of each of the data processing devices 1A to 1N by using the received preprocessed update-data (step S1007), and the EPD update controller 110 finishes this operation.

Here, the preprocess caches 1001A to 1001N created by the cloud server 1001 may be different depending on a type, a size or a resolution of the data processing devices 1A to 1N, a version of the update-control information, or a temperature.

By having a drawing process of the EPD 140, a receiving process of a next page, and a transmission process of a further next update-request (it can be a request of a preprocess preload for requesting only preprocess) overlapped on the side of the data processing devices 1A to 1N, it is possible to shorten an active time of each of the data processing devices 1A to 1N, whereby it is possible to reduce the power consumption. Furthermore, when a plurality of partial update-processes are needed in each of the data processing devices 1A to 1N in order to display one page of an electronic book or a whole screen of a browser, by executing transmission and reception with a large unit such as pages instead of executing the transmission and reception for every update-process, it is possible to reduce the power consumption for transmitting and receiving data. Moreover, by having transmission and reception by the large unit overlapped with the drawing process in each of the data processing devices 1A to 1N, it is possible to shorten the active time in each of the data processing devices 1A to 1N, and thereby, it is possible to prolong a period of being a standby mode with low power consumption which allows reduction of power consumption.

It is not necessary that the preprocess in the cloud server 1001 is executed in response to every update-request from the data processing devices 1A to 1N while it is also possible to transmit information for specifying an electronic book at a time of booting the electronic book application, for instance, executed on the data processing devices 1A to 1N, for instance, and batch executions of preprocesses for every page of the electronic book in parallel.

It is also possible to transmit the update-control information from the cloud server 1001 instead of the update-control-information selection ID. In such case, there is no necessity of storing the update-control information in the data processing devices 1A to 1N.

In the data processing devices 1A to 1N, it is not necessary to locate the update-data while locating the update-control information should be appropriate. When the preprocess is off-loaded on the cloud server 1001 every time, because the preprocess accelerator 102 in each of the data processing devices 1A to 1N becomes unnecessary, it is possible to design the data processing devices 1A to 1N to be a compact and lightweight, requiring lower power consumption. On the other hand, assuming a case where it is impossible to access a wireless LAN, the update-data can be located in the data processing devices 1A to 1N. When there is a possibility that time and power for transmission and reception via the wireless LAN dynamically vary and they may become larger than those in a case where the data processing devices 1A to 1N execute the preprocess, for instance, it is possible to conduct a test on the case where the preprocess is executed on the cloud server 1001 and a case where the preprocess is executed on each of the data processing devices 1A to 1N at a time of booting application or at a regular interval in order to determine which case is with less processing time and power consumption and to switch to the one with less processing time and power consumption.

When the preprocess caches 1001A to 1001N are arranged on a non-volatile memory such as a MRAM of a computer constructing the cloud server 1001, the power manager 115 can reduce the power consumption by powering off the MRAM during idle time.

It is also possible to control transmission and reception based on surplus power generated by the solar cell and/or battery power of the accumulator of each of the data processing devices 1A to 1N. For instance, when surplus power generated by the solar cell or residual battery power of the accumulator is plenty, in preparation for their becoming less, it is possible to execute off-loads of the preprocesses for further pages of the electronic book and receptions of the preprocess results.

It is also possible to structure such that the preprocess is executed on the cloud server 1001, and as the above-described embodiments, the preprocess caches 1001A to 1001N are managed on the side of the data processing devices 1A to 1N. In such case, after caching in each of the data processing devices 1A to 1N once, it is possible to execute the drawing process without execution of the preprocess, and thereby, it is possible to reduce the power consumption of the update-process.

Eleventh Embodiment

In the above-described embodiments, as for a scroll bar, or the like, being an interface incorporated in a web browser, a list, or the like, when the update-processes of the electronic paper by using the same update-control information for the same update-data and the update regions of the update-processes have an overlap, it is possible to structure such that a difference between the update regions is preloaded on the preprocess cache and the drawing processes are repeatedly executed using the difference on the preprocess cache. It is also possible to structure such that caches of the update-data are preloaded, the difference is calculated based in the caches, and the drawing processes are repeatedly executed using the calculated difference. In these cases, by structuring that the drawing process is immediately executed at a time when the user of the data processing device inputs a scroll bar, or the like, it is possible to improve the responsiveness and reduce the power consumption. Furthermore, at that time, by thinning the serial update-data, because a throughput is reduced, it is possible to reduce the power consumption.

Figure 27:
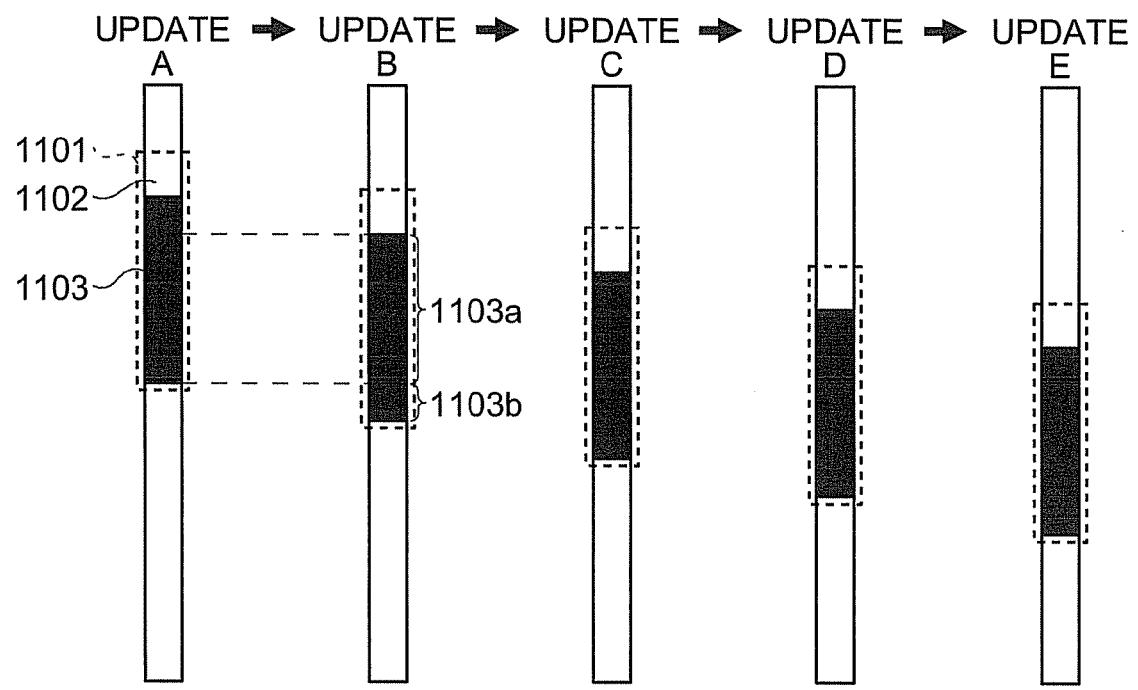
FIG. 27 is an illustration for explaining an outline of update-process according to an eleventh embodiment.

In the following, an example in which an update-mode optimized for a scroll bar is installed in an EPD update controller and an update-process is executed at the update-mode will be explained. FIG. 27 is an illustration for explaining an outline of an update-process using the update-mode optimized for a scroll bar. In FIG. 27, an instance scroll bar has a rail-shaped white background and a block knob indicating a region displayed on the EPD 140. Such scroll bar can be drawn by a binary image data. Application software or middleware issue an update-request for update-process of a scroll bar update region 1101 to the EPD update controller 110 in an order of update A→update B→update C→update D→update E; the scroll bar update region 1101 being a region surrounded by a broken line in FIG. 27 and including a black part 1103 (knob) and a white part 1102 being a rectangular area located above the black part 1103. As a result, because the black part 1103 (knob) of the scroll bar is displayed while shifting downward, it is possible to show a downward shifting of the knob.

In the update-process of the scroll bar, before a scrolling handling starts by user, e.g. at a boot of application software, or the like, a possible usage of the update mode for a scroll bar by the application software and an update-data ID (e.g. 100-th) used for issuing the update-request of the scroll bar update region 1101 are previously notified to the EPD update controller 110 as scroll bar information to be used in the update mode. At that time, also a size of the scroll bar update region 1101, sizes of the white part 1102 and the black part 1103, and so on, are notified to the EPD update controller 110. The EPD update controller 110 executes the preprocess so as to select update-control information for suppressing a residual image of a tail part (the white part 1102), and preloads a result of the preprocess to the preprocess cache with the update-data ID=100-th. Furthermore, the EPD update controller 110 divides the black part 1103 (knob) into an overlapping part 1103a of the black part 1103 between before and after shifting by unit of a shifting pitch (for instance, update A→update B) and a remaining head part 1103b. Even if a residual image of the head part 1103b remains, it is possible to erase the residual image at a time of updating the tail part (the white part 1102). Therefore, the preprocess is executed so that an update-control information capable of showing the black part 1103 as soon as possible to the user is selected, and a result thereof is preloaded to the preprocess cache with a next update-data ID=101-th, for instance.

When the update-process is executed using update-control information for suppressing a residual image, if the update-control information can firstly display black in a middle of the update-process in order to erase a residual image, it is possible to use the update-control information for taking advantage of such characteristics. In addition, the preprocess of the overlapping part 1103a is not necessary.

When an actual scrolling handling by the user starts and the update-data ID=100-th and a position of the scroll bar update region 1101 (update start position) are notified to the EPD update controller 110 one after another, because the update-data=100-th of the preprocess cache is already defined as the update-data ID for the scroll bar at a boot of the application software, the preprocess cache with the update-data ID=100-th is additionally searched and an update-process using the cached data is executed on a predetermined update position calculated based on the scroll bar information. Specifically, firstly, the updating unit 114 instructs to update the head part 1103b, and then, the updating unit 114 instructs to update the tail part (the white part 1102). Here, because the update of the head part 1103b uses the update-control information capable of showing a change to black to the user fast, it is possible to display so that the shifting of the knob follows the scrolling handling by the user, whereby it is possible to improve the user experience. Furthermore, because the residual image is erased in the update of the tail part (the white part 1102), the residual image does not remain after the scrolling handling.

Depending on a unit of the shift pitch of the knob, update may frequently occur. In such case, it is preferred that the number of updating is reduced by thinning intermediate updatings. Thereby, it is possible to reduce the power consumption. A ratio of the thinning may be one in every several times, for instance. For example, among the updates A to E shown in FIG. 27, alternate updates B and D may be skipped. Furthermore, when the number of update is many, because the number of update exceeds a number of limitations of parallel processing at the EPD controller 105, an exceeded update-process may be forced to wait for completion of a precedent update-process. In such case, it is preferable that the number of update is adjusted so as not to exceed the number of the limitations by adjusting an update interval. For example, when assumed that the update interval is T, a time for updating a rectangular area is R, and an upper limit of parallel processing is P, because it is possible to prevent the number of update from exceeding the upper limit of parallel processing by thinning intermediate updatings so as to R/P becomes larger than T, it is possible to prevent the exceeded update-process from being forced to wait for completion of the precedent update-process.

Figure 28:
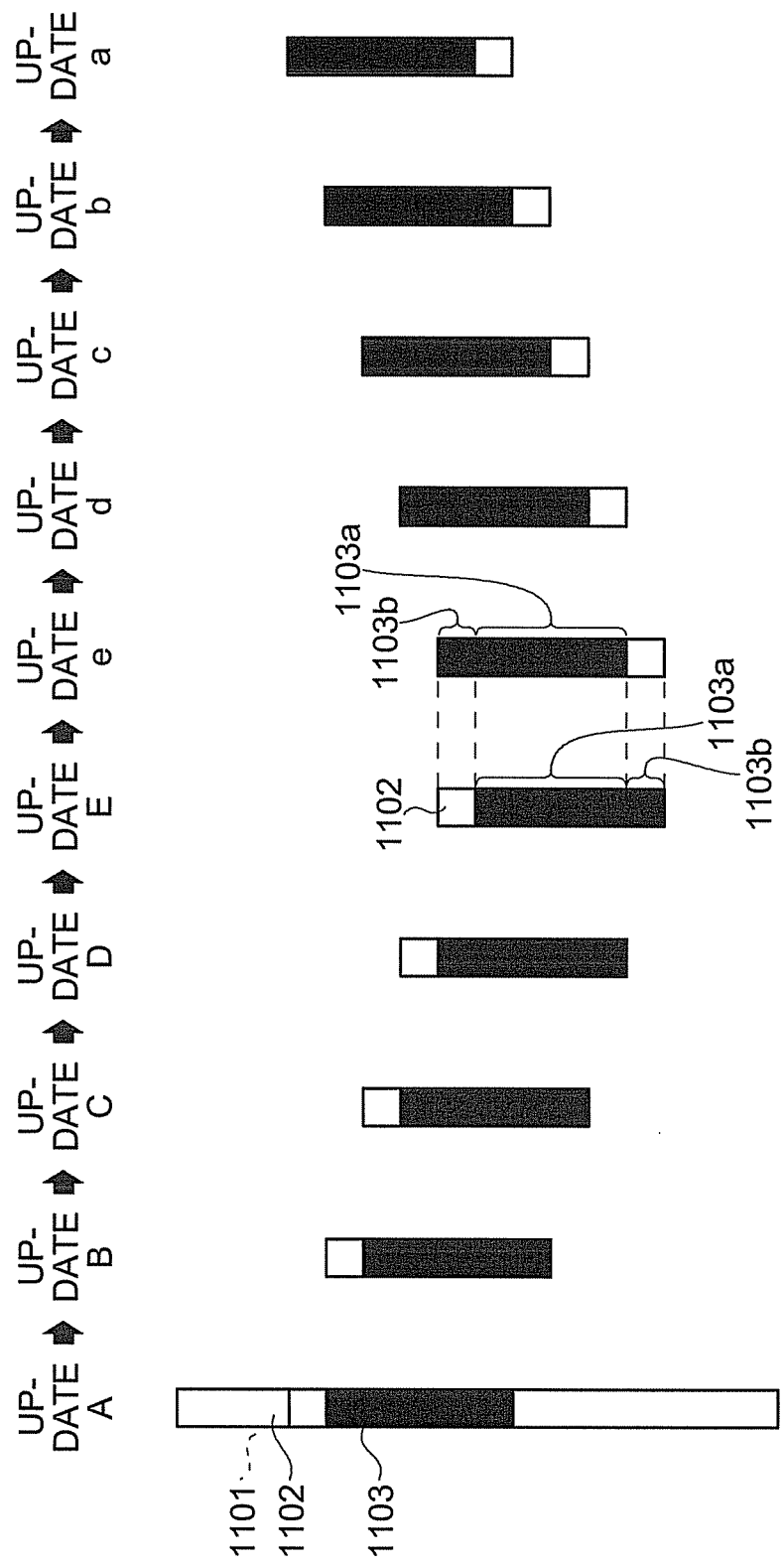
FIG. 28 is an illustration showing an outline of update-process in a case where a moving direction of a knob is changed in FIG. 27.

FIG. 28 shows an outline of an update-process in a case where a moving direction of the knob is suddenly changed from downward to upward based on a user's operation in FIG. 27. In the example shown in FIG. 28, after executing the update-processes in the order from the update A to the update E, update-requests are issued to the EPD update controller 110 in an order from update e to update a. In this case, if the update-process of the tail part (the white part 1102) of the update E takes long time, the update-process of the update e in which the head part 1103b is updated into black and an update-process of a region which is under the head part 1103b of the update d and on the same height with the head part of the update e are waited for completion of the update of the tail part (the white part 1102) of the update E. Therefore, when the whole scroll bar update region is updated without being divided, there is a case where whole of the update-processes of the updates e and d wait for completion of the precedent update-process and shifting of the knob does not follow the scroll handling by the user. Therefore, by executing the update-process while dividing the head part 1103b and the tail part (the white part 1102), it is possible to execute the update-process of the head part 1103b of the update d and the update-processes of the updates e and d for updating into white without being affected by the precedent update-process. Thereby, it is possible to display so that the knob shifts following the scroll handling by the user, whereby it is possible to improve the usability. The update of the head part 1103b of the update e is executed after the update of the tail part (the white part 1102) of the update E.

Twelfth Embodiment

Next, a data processing device, a display control device, a semiconductor chip, a method of controlling display device, and a computer-readable medium according to a twelfth embodiment will be described in detail with the accompanying drawings. In the following, for the same configurations as in the above-described embodiment(s), redundant explanations will be omitted by referring to them using the same reference numbers.

The configuration for operating an essential part of the update-process using the microcontroller 400 in the fourth embodiment is not limited to the data processing device 4 having the EPD 140, it is also possible to apply the configuration to a smartphone, a tablet PC, a cell phone, or the like, which has a general display such as a LCD. The preprocess in such case includes a rendering process and an update-data creating process for creating a screen to be displayed. A value registered on the preprocess cache may be a content of a frame buffer used by a display, which is a result of the preprocess.

Figure 29:
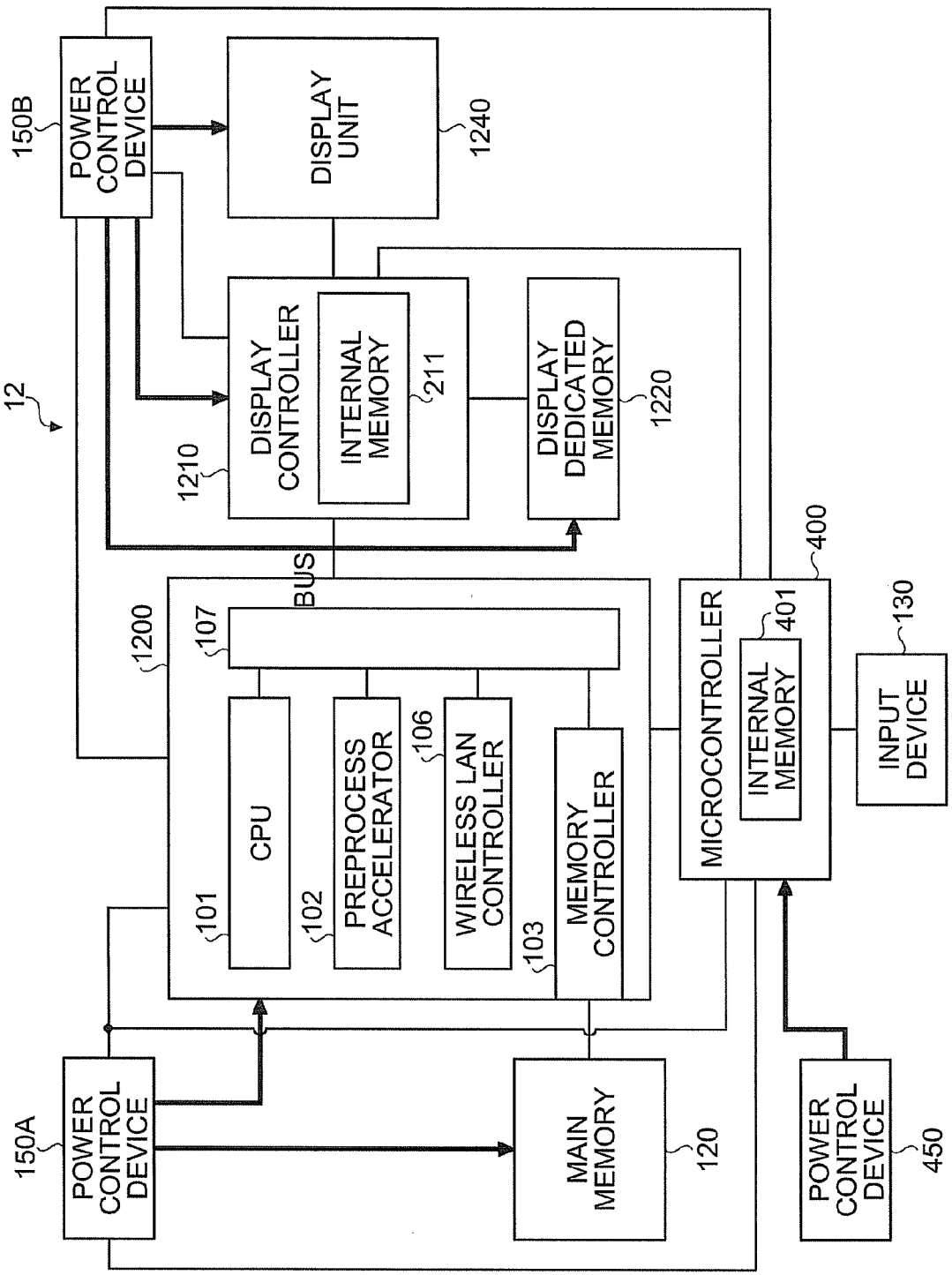
FIG. 29 is a block diagram showing an outline configuration of a data processing device according to a twelfth embodiment.

FIG. 29 is a block diagram showing an outline structure of a data processing device according to the twelfth embodiment. As shown in FIG. 29, the data processing device 12 according to the twelfth embodiment has the same configuration of the data processing device 4 (see FIG. 11) according to the fourth embodiment, except that the EPD 140 is replaced with a display unit 1240 such as a LCD, the EPD controller 210 is replaced with a display controller 1210, the EPD dedicated memory 220 is replaced with a display dedicated memory 1220, and the SoC 100 is replaced with a SoC 1200 having the preprocess accelerator 102.

When the microcontroller 400 receives a request of interruption handling from a keyboard, or the like, the microcontroller 400 determines whether a preprocess cache of an update-process corresponding to the interruption exists or not, and when the corresponding preprocess cache exists (cache-hit), the microcontroller 400 sends the update-request to the display controller 1210 directly, and when the corresponding preprocess cache does not exist (cache-miss), the microcontroller 400 sends an interruption to the SoC 1200 and, if needed, makes the SoC 1200 issue an update-request to the display unit 1240. Therefore, when the process cache exists (cache-hit), because it is possible to maintain power supplied to the main memory 120 at power which is lower than power for normal read/write and is capable of holding contents in the memory while maintaining power-off of the SoC 1200, it is possible to execute the update-process using a minimum configuration for updating, whereby it is possible to drastically reduce the power consumption. For example, in a case such as an electronic book application, for opening a new electronic book, the operation is executed with a configuration including the SoC 1200 and the main memory 120, and for most of time during which simple page-turnings for browsing the electronic book are repeated, the operation is executed with the minimum configuration without the SoC 1200 and the main memory 120.

The data processing device 12 has the SoC 1200, the main memory 120, the display unit 1240, the display controller 1210, the display dedicated memory 1220, the power control devices 150A and 150B, the power control device 450, the microcontroller 400, and one or more input devices 130.

Power consumption of the microcontroller 400 is lower than the SoC 1200, and the microcontroller 400 is normally powered on. The microcontroller 400 has an internal memory 401, and a tag part of a preprocess cache is registered on the internal memory 401.

The display controller 1210 has the internal memory 211. On the internal memory 211, the preprocess cache formed by a plurality of update-data is stored. The tag part of the preprocess cache is also stored on the internal memory 211 of the display controller 1210. A consistency between the tag part of the preprocess stored on the internal memory 211 of the display controller 1210 and the tag part of the preprocess stored on the internal memory 401 of the microcontroller 400 should be maintained.

In the twelfth embodiment, a display update controller is a process in the display controller 1210. The configuration thereof can be the same as the EPD update controller 110 shown in FIG. 2, for instance. However, the cache determining unit 112 is also incorporated in the microcontroller 400. In addition, a power manager for powering on/off the SoC 1200 can be incorporated in the microcontroller 400. The preprocessor 113 is a process of OS, middleware or application software operating on the CPU 101, and as the preprocessor 113, it is possible to use the preprocess accelerator 102, or the like.

FIG. 30 shows an configuration example of the preprocess cache registered on the display controller 1210. The preprocess cache is constructed from a plurality of cache entries. In an example shown in FIG. 30, four cache entries are registered as preprocess caches. Each cache entry includes a pair of a tag part and a preprocess cache data part.

The tag part includes the preprocessed update-data and a valid bit. The application software, or the like, issues the update-request for the display unit 1240 while adding a preprocess update-data ID for identifying preprocessed update-data. The cache determining unit 112 received such update-request determines whether the cache-hit is true or false. In the cache determination, by searching the tag parts in the cache entries, it is determined whether there is an entry in which the preprocess update-data ID is matched and the VALID bit indicating whether data of a corresponding cache entry is valid or invalid indicates valid.

The preprocessed update-data ID is information for identifying preprocessed update-data. In an update-process using the same preprocessed update-data while application software or middleware manages preprocess update-data and an preprocessed update-data ID with association between them, for instance, an update-request with the same preprocessed update-data ID is issued to the display update controller.

In the preprocess cache data part, preprocess cache data is stored. A size of preprocessed update-data is a size of a frame buffer for storing data for updating a display, and in this example, the data size thereof is the same.

Figure 31:
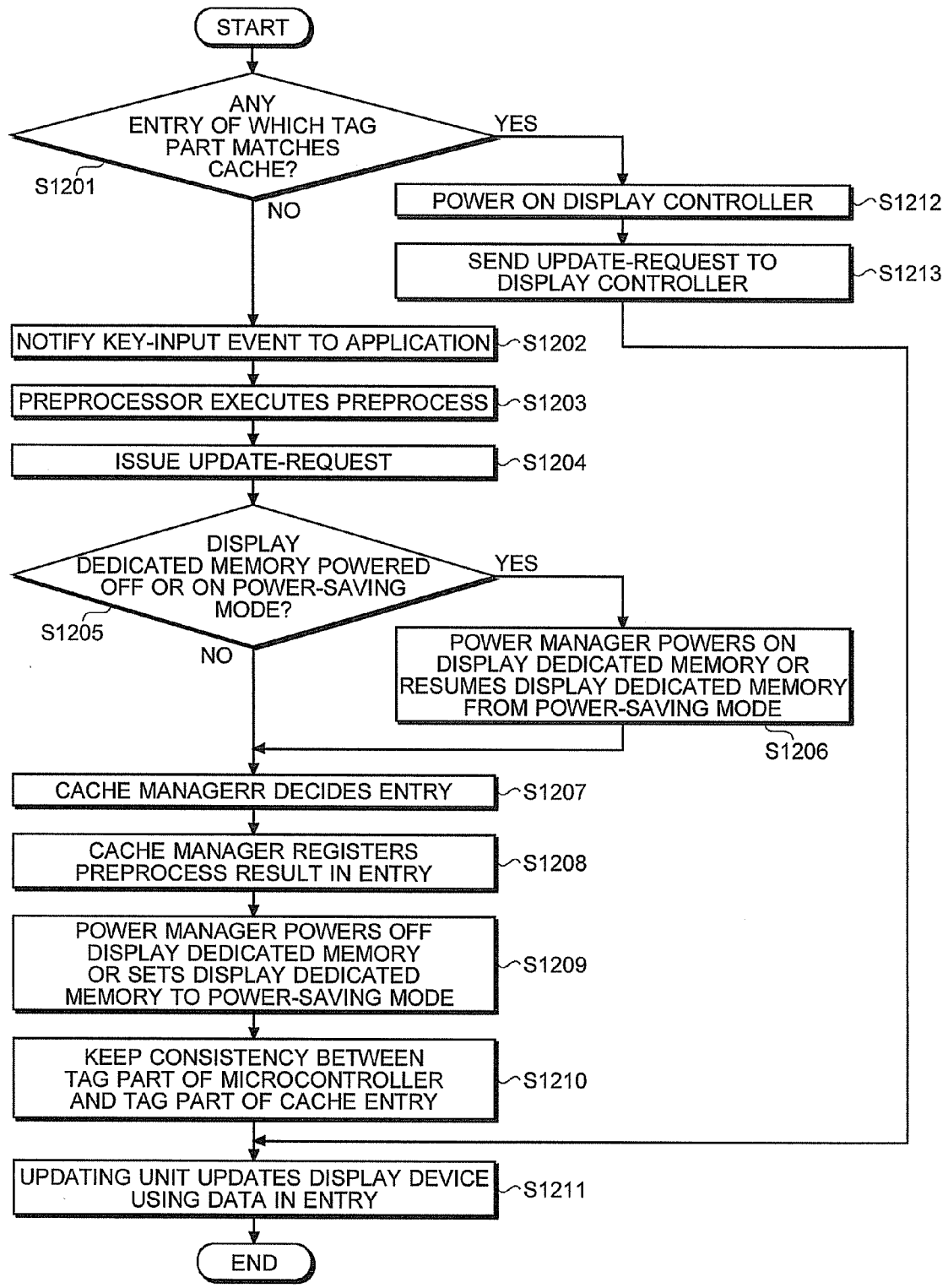
FIG. 31 is a flowchart showing an example of update-process according to the twelfth embodiment.

FIG. 31 is a flow chart showing an example of update-process according to the twelfth embodiment. In the example shown in FIG. 31, the display update controller caches the preprocessed update-data. This process is started when an interruption to the microcontroller 400 occurs due to user of the data processing device 12 conducting a key-input on a keyboard, or the like. As the third embodiment, for a specific key on a keyboard, a specific preprocessed update-data ID is previously assigned.

As shown in FIG. 31, in the update-process, the cache determining unit 112 on the microcontroller 400 checks whether a cache entry which matches a preprocessed update-data ID notified at the time of the interruption exists on the preprocess cache or not (cache determination) using a tag part of the preprocess cache on the internal memory 401 of the microcontroller 400 (step S1201), and when the cache entry exists (step S1201; YES), the microcontroller 400 instructs the power control device 150B to power the display controller 1210 in order to power on the display controller 1210 (step S1212), transmits an update-request to the display controller 1210 (step S1213), and progresses to step S1211. On the other hand, when the cache entry does not exist (step S1201; NO), the cache determining unit 112 on the microcontroller 400 notifies an interruption to the SoC 1200. Thereby, a process corresponding to a key-input event is notified to application software (step S1202), and the process corresponding to the key-input event is executed by the application software. After that, as a result thereof, the preprocessor 113 executes the preprocess such as rendering, or the like, using the preprocess accelerator 102, or the like, such as a GPU, or the like (step S1203), and by using the obtained preprocess result, an update-request with the preprocessed update-data ID is issued to the display controller 1210 (step S1204). Here, at the time of notification of the interruption to the SoC 1200, when the SoC 1200 is powered off, the power manager 115 of the microcontroller 400 powers on the SoC 1200 using the power control device 150A, and then, notifies the interruption. Moreover, after the update-request is issued to the display controller 1210 as a result of the process corresponding to the key-input event, it is possible to let the SoC 1200 transit to a standby mode with low power consumption or to let the power manager 115 of the microcontroller 400 instruct to stop supplying power to the SoC 1200.

Next, the power manager 115 being a process of the display controller 1210 checks whether the display dedicated memory 1220 is powered off or is set to the power-saving mode with comparatively low power consumption or not (step S1205), and when the display dedicated memory 1220 is powered off or is set to the power-saving mode (step S1205; YES), the power manager 115 powers on the display dedicated memory 1220 and resumes the display dedicated memory 1220 to a readable/writable mode (normal mode) from the power-saving mode using the power control device 150B (step S1206), and the display controller 1210 progresses to step S1207. On the other hand, when the display dedicated memory 1220 is powered on (step S1205; NO), the display controller 1210 directly progresses to the step S1207.

In step S1207, the cache manager 111 being a process of the display controller 1210 decides the cache entry using an algorithm such as LRU for determining a cache entry to be replaced (step S1207). Then, the preprocessor 113 being a process of the display controller 1210 registers a result of the preprocess executed at step S1203 on the decided cache entry (step S1208).

Next, the power manager 115 being a process of the display controller 1210 powers off the display dedicated memory 1220 or sets the display dedicated memory 1220 to the power-saving mode using the power control device 150B (step S1209). Then, by transmitting information of the tag part of the preprocess from the cache manager 111 of the display controller 1210 to the microcontroller 400 and executing a process of updating the tag part for getting synchronization on the microcontroller 400, the tag part stored on the internal memory 401 of the microcontroller 400 and the tag part stored on the internal memory 211 of the display controller 1210 are made to synchronize with each other (step S1210), and the display controller 1210 progresses to step S1211. Thereby, the consistency between the tag part stored on the internal memory 401 of the microcontroller 400 and the tag part stored on the internal memory 211 of the display controller 1210 is maintained. Here, this step S1210 can be executed via the SoC 1200.

In step S1211, the updating unit 114 being a process of the display controller 1210 reads out the preprocessed update-data registered on the preprocess cache, and executes a update-process to the display unit 1240 (step S1211). After that, the display controller 1210 finishes this operation.

Here, when the display unit 1240 is set to a standby mode while the screen of the display unit 1240 is black out after completion of the update-process, the power manager 115 powers off the display unit 1240 and the display controller 1210 using the power control device 150B. When the internal memory 211 of the display controller 1210 is a non-volatile memory, cached data is maintained even if the display controller 1210 is powered off. On the other hand, when a volatile memory is used for the internal memory 211, it is possible that data on the internal memory 211 is forwarded to the display dedicated memory 1220 and the display dedicated memory 1220 is set to a power-saving mode capable of maintaining contents thereon, that the internal memory 211 is set to the power-saving mode capable of maintaining the contents thereon, or that only the internal memory is supplied power.

In the twelfth embodiment, although the consistency between the tag part in the microcontroller 400 and the tag part in the display controller 1210 is maintained in step S1210, when update-process to be cached are limited to a plurality of specific preprocessed update-data IDs, it is possible to omit step S1210 by previously arranging the IDs to the data processing device 12.

Thirteenth Embodiment

As the twelfth embodiment, the configuration in that the internal memory 104 of the SoC 100 is used as the preprocess cache according to the third embodiment is not limited to the data processing device 4 according to the fourth embodiment, it is also possible to apply the configuration to a smartphone, a tablet PC, a cell phone, or the like, which has a general display such as a LCD. The preprocess in such case includes a rendering process and an update-data creating process for creating a screen to be displayed. A value registered on the preprocess cache may be a content of a frame buffer, which is a result of the preprocess.

Figure 32:
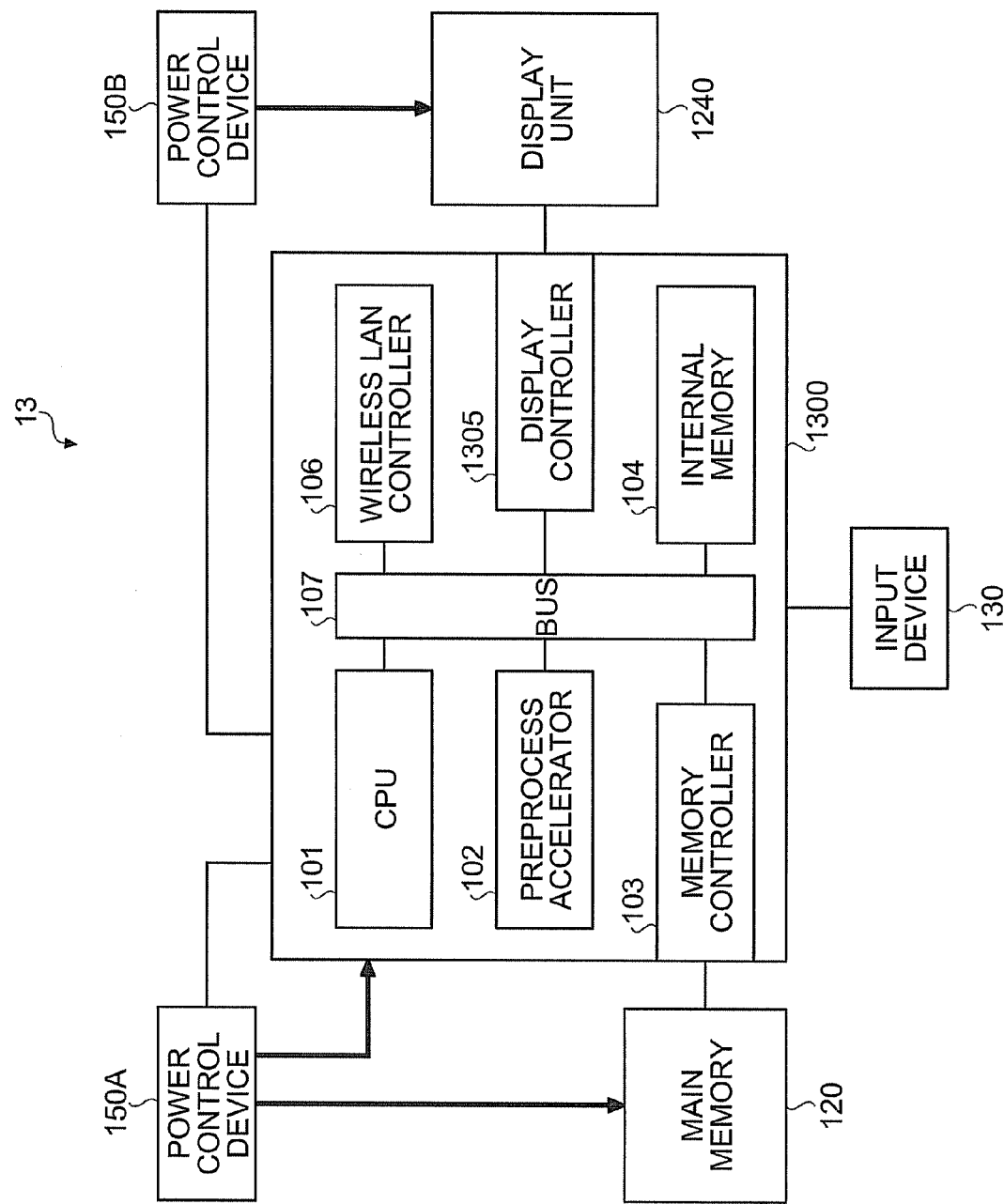
FIG. 32 is a block diagram showing an outline configuration of a data processing device according to a thirteenth embodiment.

FIG. 29 is a block diagram showing an outline structure of a data processing device according to the twelfth embodiment. As shown in FIG. 32, a data processing device 13 according to the thirteenth embodiment has the same configuration as the data processing device 1 (see FIG. 1) according to the first embodiment, except that the EPD 140 is replaced with the display unit 1240 such as a LCD and the EPD controller 105 is replaced with a display controller 1305.

Fourteenth Embodiment

Furthermore, in the configuration of the thirteenth embodiment, as the sixth embodiment, it is possible to speed up the restore process from the suspended state in hibernation. In such case, before transiting to the standby mode with low power consumption, the preprocessed update-data to be displayed after resuming may be stored on the preprocess cache on the internal memory 104.

Fifteen Embodiment

Moreover, in the above-described embodiment, as shown in FIG. 33, a parameter of a temperature range can be added to the tag part of the preprocess cache. That is, in the fifteenth embodiment, a data processing device has a temperature sensor, and a different update-control information is used depending on a temperature of a space where the temperature sensor is located.

While a certain embodiment has been described, this embodiment has been presented by way of example only, and is not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. A data processing device comprising a processor and/or memory field for:
    converting update-data for updating at least a part of an electronic paper into processed update-data to be displayed;
    selecting an update-control-information identifier to be used for updating the electronic paper with the processed update-data;
    storing the processed update-data and a selected update-control-information identifier on a first memory;
    instructing a drawing process of the electronic paper using the processed update-data and the update-control-information identifier stored on the first memory; and
    executing, when a first instruction requesting a first drawing process of the electronic paper using the processed update-data and the update-control-information identifier is instructed, the first drawing process using the processed update-data and the update-control-information identifier stored on the first memory, and executing, when a second instruction requesting a second drawing process of the electronic paper using the processed update-data and the update-control-information identifier is instructed, the second drawing process reusing the processed update-data and the update-control-information identifier stored on the first memory, wherein
    the processor executes a process for converting another update-data for which update-request for updating the electronic paper has not been issued into another processed update-data to be displayed,
    the processor executes a process for selecting another update-control-information identifier to be used for updating the electronic paper with the another processed update-data created from the another update-data, and
    the another update-data is data to be displayed on a screen of the electronic paper in response to an operation by a user, and is data that is able to be chosen by the user.

2. The device according to claim 1, wherein
    the processor stores an update-data ID for specifying the update-data on the first memory while letting the update-data ID corresponding to the processed update-data created by the converting, and stores an update-method being information for selecting update-control information used for updating the electronic paper with the processed update-data on the first memory while letting the update-method corresponding to the update-control-information identifier selected by the selecting.

3. The device according to claim 1, further comprising
    a power controller that, when the processor does not execute the first or second drawing process, switches power supplied to the first memory from a first power to be supplied while the processor is executing the first or second drawing process to a second power being smaller than the first power.

4. The device according to claim 3, wherein
    the first memory is a non-volatile memory, and
    the power controller, when the processor does not execute the first or second drawing process, determines power at a time when power supply to the first memory is stopped as the second power.

5. The device according to claim 1, wherein
    the update-data is stored on a second memory different from the first memory.

6. The device according to claim 1, wherein
when the processor executes the first or second drawing process, the processor executes the process for selecting the another update-control-information identifier to be used for updating the electronic paper with the another processed update-data created from the another update-data while the processor executes the process for converting the another update-data into the another processed update-data to be displayed.

7. The device according to claim 6, wherein
the update-data and the another update-data have an order relation in which an order of the update-data is pervious than that of the another update-data.

8. The device according to claim 1, wherein
the first memory stores locking information for permitting or forbidding erasure of the processed update-data and the update-control-information identifier from the first memory while letting the locking information corresponding to the processed update-data and the update-control-information identifier, and
the processor selects the processed update-data and the update-control-information identifier to be erasing from the first memory based on the locking information.

9. The device according to claim 8, wherein
the update-request for instructing to use the processed update-data and the update-control-information identifier for which erasure is forbidden by the locking information stored on the first memory requests to execute a drawing process of the electronic paper using the processed update-data and the update-control-information identifier stored on the first memory without operating the processor.

10. The device according to claim 1, wherein
the processor, when update-target regions are overlapping with each other and the same update-data and update-methods are used for update-processes of the update-target regions, executes an update-process with respect to a difference from a previously-executed update-process.

11. A data processing device comprising a processor and/or memory field for:
converting update-data for updating at least a part of an electronic paper into processed update-data to be displayed;
selecting an update-control-information identifier to be used for updating the electronic paper with the processed update-data;
storing the processed update-data and a selected update-control-information identifier on a first memory;
instructing a drawing process of the electronic paper using the processed update-data and the update-control-information identifier stored on the first memory; and
executing, when a first instruction requesting a first drawing process of the electronic paper using the processed update-data and the update-control-information identifier is instructed, the first drawing process using the processed update-data and the update-control-information identifier stored on the first memory, and executing, when a second instruction requesting a second drawing process of the electronic paper using the processed update-data and the update-control-information identifier is instructed, the second drawing process reusing the processed update-data and the update-control-information identifier stored on the first memory, wherein
the processor executes a process for converting another update-data for which update-request for updating the electronic paper has not been issued into another processed update-data to be displayed,
the processor executes a process for selecting another update-control-information identifier to be used for updating the electronic paper with the another processed update-data created from the another update-data,
directly before power being supplied to the data processing device is switched from a third power to a fourth power being smaller than the third power, the processor executes the process for selecting the another update-control-information identifier to be used for updating the electronic paper with the another processed update-data created from the another update-data while the processor executes the process for converting the another update-data into the another processed update-data to be displayed,
the another update-data is data of an update-process corresponding to complication of a restore process of the device, and
when the number of the braches included in the update-process corresponding to complication of the restore process is less than a first threshold, directly before the power being supplied to the data processing device is switched from the third power to the fourth power, the processor executes the process for selecting the another update-control-information identifier to be used for updating the electronic paper with the another processed update-data created from the another update-data while the data converter executes the process for converting the another update-data into the another processed update-data to be displayed.

12. The device according to claim 11, wherein
the process for switching the power being supplied to the data processing device from the third power to the fourth power being smaller than the third power is a hibernation process for storing information necessary to resuming of the data processing device on a non-volatile memory.

13. A data processing device comprising a processor and/or memory field for:
converting update-data for updating at least a part of an electronic paper into processed update-data to be displayed;
selecting an update-control-information identifier to be used for updating the electronic paper with the processed update-data;
storing the processed update-data and a selected update-control-information identifier on a first memory;
instructing a drawing process of the electronic paper using the processed update-data and the update-control-information identifier stored on the first memory; and
executing, when a first instruction requesting a first drawing process of the electronic paper using the processed update-data and the update-control-information identifier is instructed, the first drawing process using the processed update-data and the update-control-information identifier stored on the first memory, and executing, when a second instruction requesting a second drawing process of the electronic paper using the processed update-data and the update-control-information identifier is instructed, the second drawing process reusing the processed update-data and the update-control-information identifier stored on the first memory, wherein
the processor executes a process for converting another update-data for which update-request for updating the electronic paper has not been issued into another processed update-data to be displayed,
the processor executes a process for selecting another update-control-information identifier to be used for updating the electronic paper with the another processed update-data created from the another update-data, directly before power being supplied to the data processing device is switched from a third power to a fourth power being smaller than the third power, the processor executes the process for selecting the another update-control-information identifier to be used for updating the electronic paper with the another processed update-data created from the another update-data while the processor executes the process for converting the another update-data into the another processed update-data to be displayed, the another update-data is data of an update-process corresponding to complication of a restore process of the device, and when a time required for the update-process corresponding to complication of the restore process is shorter than a first threshold, directly before the power being supplied to the data processing device is switched from the third power to the fourth power, the processor executes the process for selecting the another update-control-information identifier to be used for updating the electronic paper with the another processed update-data created from the another update-data while the data converter executes the process for converting the another update-data into the another processed update-data to be displayed.

* * * * *